(12) United States Patent
Wang et al.

(10) Patent No.: US 12,010,686 B2
(45) Date of Patent: Jun. 11, 2024

(54) SCHEDULING REQUEST TRANSMISSION ON DIRECT DEVICE FEEDBACK CHANNEL FOR DIRECT DEVICE COMMUNICATION

(71) Applicant: QUALCOMM Incorporated, San Diego, CA (US)

(72) Inventors: Xiaojie Wang, Hillsborough, NJ (US); Piyush Gupta, Bridgewater, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/443,073

(22) Filed: Jul. 20, 2021

(65) Prior Publication Data

US 2022/0030613 A1 Jan. 27, 2022

Related U.S. Application Data

(60) Provisional application No. 63/054,718, filed on Jul. 21, 2020.

(51) Int. Cl.
*H04W 72/20* (2023.01)
*H04L 1/1812* (2023.01)
(Continued)

(52) U.S. Cl.
CPC ........... *H04W 72/20* (2023.01); *H04L 1/1812* (2013.01); *H04L 5/0055* (2013.01); *H04L 27/2607* (2013.01); *H04W 72/23* (2023.01)

(58) Field of Classification Search
CPC .... H04W 72/20; H04W 72/23; H04L 1/1812; H04L 5/0055; H04L 27/2607
(Continued)

(56) References Cited

U.S. PATENT DOCUMENTS

2020/0136777 A1* 4/2020 He .................. H04L 5/0007
2020/0170005 A1* 5/2020 Matsumura ......... H04L 27/2605
(Continued)

FOREIGN PATENT DOCUMENTS

KR 20200054028 A 5/2020
WO 2020136851 A1 7/2020

OTHER PUBLICATIONS

International Search Report and Written Opinion dated Nov. 12, 2021 from corresponding PCT Application No. PCT/US2021/042585.
(Continued)

*Primary Examiner* — Obaidul Huq
(74) *Attorney, Agent, or Firm* — Arent Fox, LLP

(57) ABSTRACT

A first apparatus may be configured to generate a scheduling request to request to transmit at least one of data or control information on a sidelink channel. The first apparatus may be further configured to transmit, to another UE, the scheduling request on resources of a channel configured to carry feedback responsive to transmissions on the sidelink channel. A second apparatus may be configured to monitor resources on a channel for transmissions from other UE, the channel being configured to carry feedback from the other UE responsive to transmissions on a sidelink channel. The second apparatus may be further configured to receive at least one scheduling request from at least one of the other UE on the resources of the channel configured to carry the feedback based on monitoring the resources on the channel.

26 Claims, 13 Drawing Sheets

(51) Int. Cl.
  *H04L 5/00*    (2006.01)
  *H04L 27/26*   (2006.01)
  *H04W 72/23*   (2023.01)

(58) Field of Classification Search
  USPC ..................................... 370/310, 328, 329
  See application file for complete search history.

(56) References Cited

U.S. PATENT DOCUMENTS

| | | | |
|---|---|---|---|
| 2020/0196343 A1* | 6/2020 | Marinier | H04L 5/0053 |
| 2021/0243796 A1* | 8/2021 | Panteleev | H04L 1/1858 |

OTHER PUBLICATIONS

Spreadtrum Communications: "Discussion on NR V2X physical layer procedure", 3GPP Draft; R1-1902724 Discussion on NR V2X Physical Layer Procedure Final, 3rd Generation Partnership Project (3GPP), Mobile Competence Centre; 650, Route Des Lucioles ; F-06921 Sophia-Antipolis Ced vol. RAN WG1, No. Athens, Greece; Feb. 25, 2019-Mar. 1, 2019 Feb. 16, 2019 (Feb. 16, 2019), XP051600419, Retrieved from the Internet: URL:http://www.3gpp.org/ftp/tsg%5Fran/WG1%5FRL1/TSGR1%5F96/Docs/R1%2D1902724%2Ezip [retrieved on Feb. 16, 2019] Section 2.2; line 4-line 5.

* cited by examiner

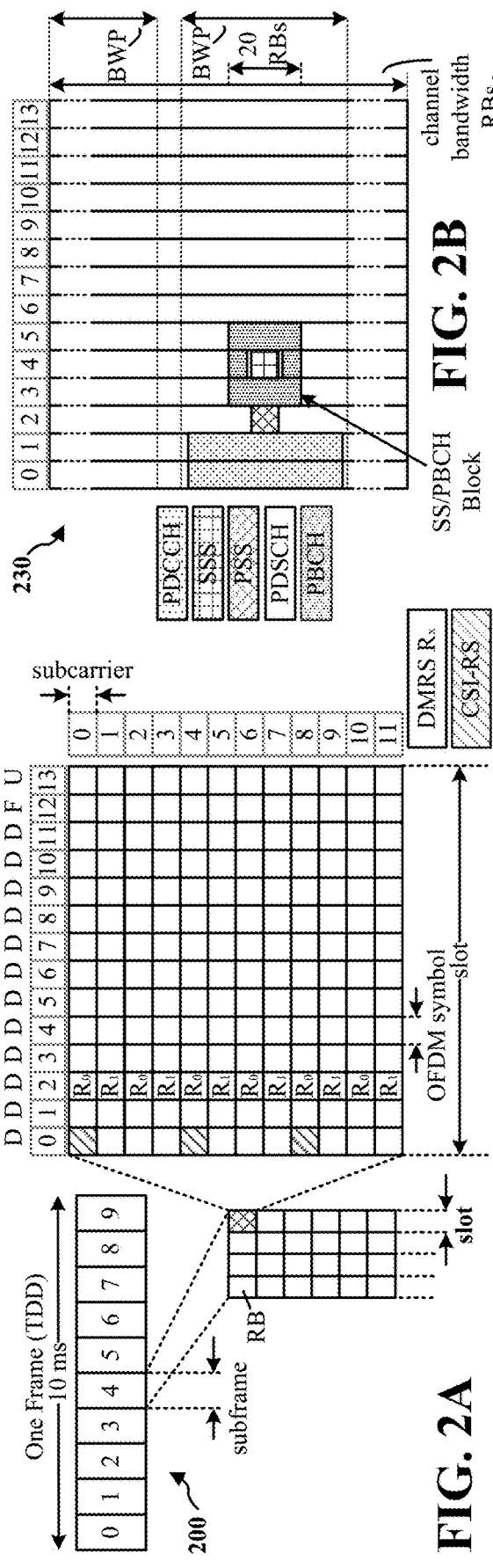
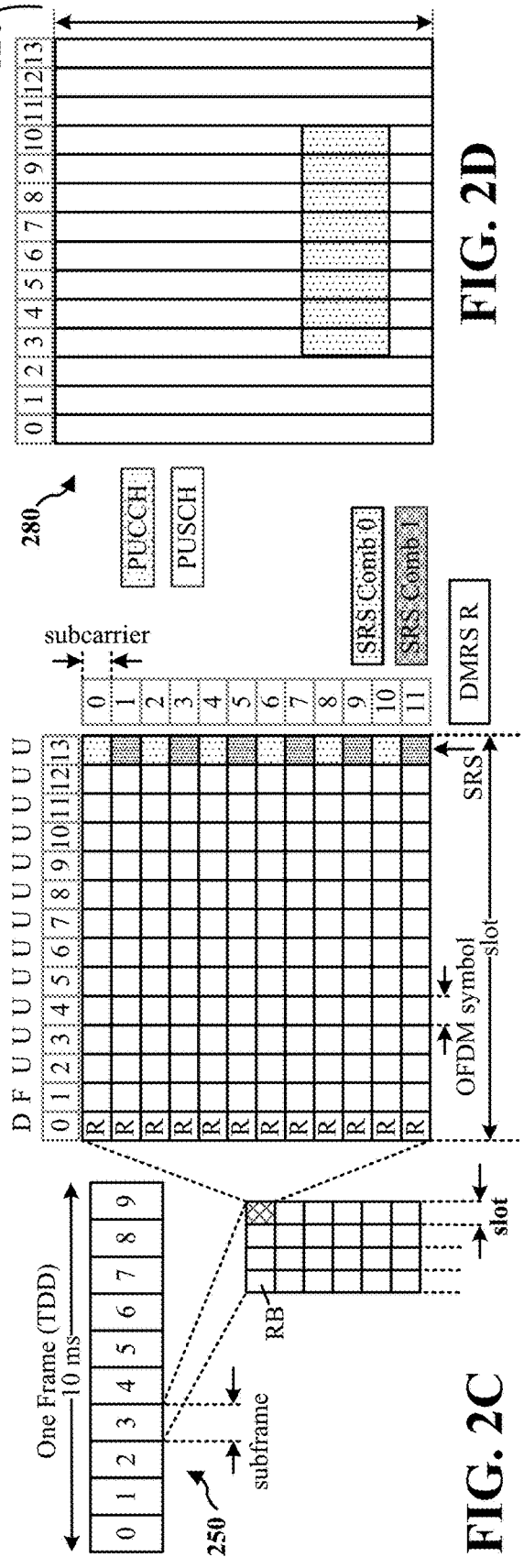

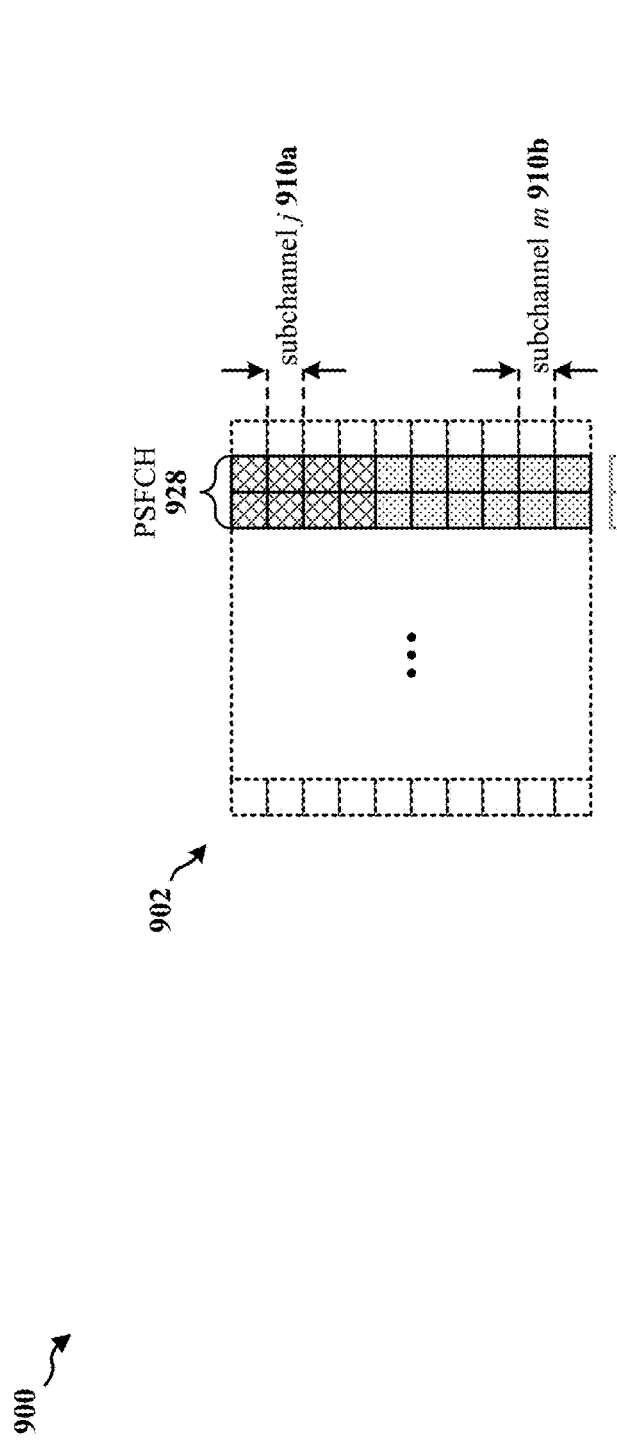
FIG. 9

SCHEDULING REQUEST TRANSMISSION ON DIRECT DEVICE FEEDBACK CHANNEL FOR DIRECT DEVICE COMMUNICATION

CROSS REFERENCE TO RELATED APPLICATION(S)

This application claims the benefit of U.S. Provisional Application Ser. No. 63/054,718, entitled "SIDELINK SCHEDULING REQUEST TRANSMISSION ON SIDELINK FEEDBACK CHANNEL" and filed on Jul. 21, 2020, the disclosure of which is expressly incorporated by reference herein in its entirety.

BACKGROUND

Technical Field

The present disclosure generally relates to communication systems, and more particularly, to a user equipment that transmits a scheduling request for sidelink communication on a channel configured for sidelink feedback.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example access network, direct device communication—also referred to as "sidelink communication"—may be configured on a set of resources, which may include a set of slots in the time domain and a set of subchannels in the frequency domain that each spans between 10 and 100 resource blocks (RBs). In a slot configured for sidelink communication, a first set of resources may be configured to carry control information for the sidelink communication, whereas a second set of resources may be configured to carry the data of the sidelink communication. In addition, a third set of resources within the slot may be configured to carry feedback for the sidelink communication.

In some aspects, feedback for sidelink communication may include hybrid automatic repeat request (HARQ) feedback. According to HARQ feedback, a user equipment (UE), may transmit either acknowledgement (ACK) or non-acknowledgement (NACK) feedback based on receiving data and/or control information on a preceding set of resources. Such ACK/NACK feedback may be conveyed using at least one bit.

According to an example radio access technology (RAT), such as 5G New Radio (NR), the aforementioned third set of resources configured to carry HARQ feedback for sidelink communication may be a physical sidelink feedback channel (PSFCH). The PSFCH may be allocated on one or more subchannels over two symbols of a slot. For each UE that transmits sidelink feedback, the HARQ ACK/NACK may occupy only a single RB (e.g., only one bit may be needed to convey each of ACK or NACK feedback). Thus, multiple resources allocated for the PSFCH may be unused even when HARQ ACK/NACK feedback is carried thereon.

By way of illustration, the PSFCH may be configured on one subchannel, and therefore, between 10 and 100 RBs may be allocated to the resource pool available for sidelink HARQ feedback. As the sidelink HARQ feedback may occupy only a single RB, only between 1% (e.g., for 100 RBs per subchannel) and 10% (e.g., for 10 RBs per subchannel) of the RBs allocated for the PSFCH may be used for a UE to transmit HARQ ACK/NACK feedback in unicast mode. Such percentages demonstrate the clear underutilization of resources allocated for the PSFCH, and this underutilization is amplified (e.g., less than 1% utilization) when the PSFCH is configured on multiple subchannels.

Potentially, multiple UEs may be configured in groupcast mode, and therefore, multiple UEs may be configured to transmit HARQ ACK/NACK feedback on the same PSFCH resources. However, an appreciable amount of PSFCH resources may remain unused while still accommodating for HARQ feedback in groupcast mode. Such allocations that allow for substantial underutilization of resources are wasteful and contribute to overhead and inefficiencies that may adversely impact system performance and user experience.

The present disclosure provides for various techniques and solutions to decreasing resource underutilization. In so doing, sidelink communication is improved, for example, by meeting or exceeding quality of service (QoS) parameters established by various RATs and/or enabling some technologies for various RATs. Illustratively, the techniques and solutions of the present disclosure may be applied to cellular vehicle-to-everything (C-V2X) technologies of 5G NR.

In one aspect of the disclosure, a first method, a first computer-readable medium, and a first apparatus are provided. The first apparatus may be a UE or a component thereof. The first apparatus may be configured to generate a scheduling request to request to transmit at least one of data or control information on a sidelink channel. The first apparatus may be further configured to transmit, to another UE, the scheduling request on resources of a channel configured to carry feedback responsive to transmissions on the sidelink channel.

In another aspect of the disclosure, a second method, a second computer-readable medium, and a second apparatus are provided. The second apparatus may be a UE or a component thereof. The second apparatus may be configured to monitor resources on a channel for transmissions from other UE, the channel being configured to carry feedback from the other UE responsive to transmissions on a sidelink channel. The second apparatus may be further configured to receive at least one scheduling request from at least one of the other UE on the resources of the channel configured to carry the feedback based on monitoring the resources on the channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIG. 9 is a diagram illustrating yet another example resource configuration for sidelink communication.

DETAILED DESCRIPTION

Figure 1:
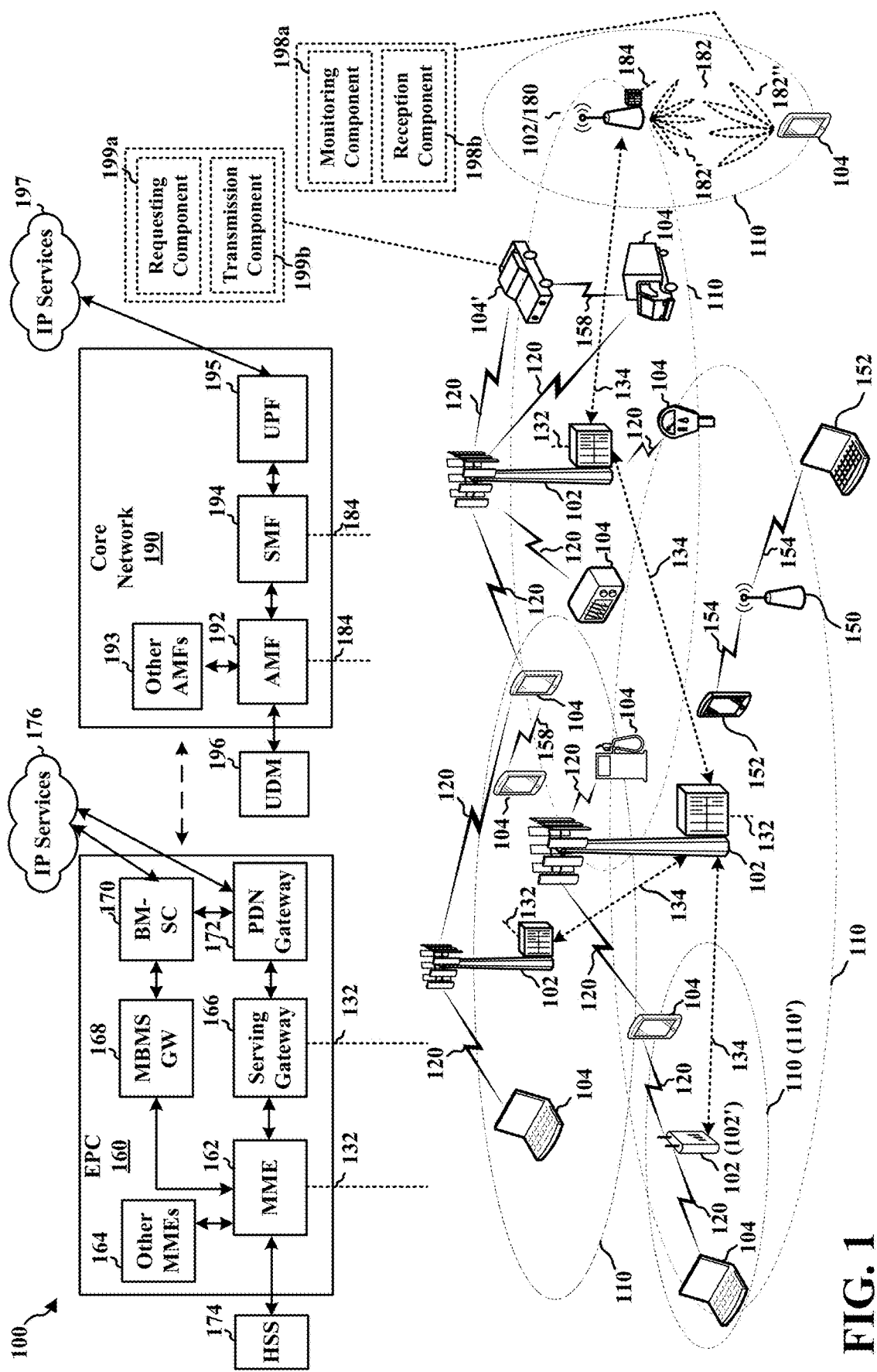
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, any person having ordinary skill in the art will recognize that these concepts and related aspects may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), and further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, a base station 102 operating as an IAB donor may provide a link to the one of the EPC 160 or the core network 190 for one or more UEs and/or other IAB nodes, which may be directly or indirectly connected (e.g., separated from an IAB donor by more than one hop) with the IAB donor. In the context of communicating with the EPC 160 or the core network 190, both the UEs and IAB nodes may communicate with a DU of an IAB donor. In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless and other radio links may be on one or more carriers, or component carriers (CCs). The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE is configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, may be less than 7 GHz, may be within FR1, or may include mid-band frequencies. Further, unless specifically stated otherwise, the term "millimeter wave" and other similar references, to the extent used herein, may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, a first UE 104 and a second UE 104' may be configured to communicate according to certain direct device technologies and associated telecommunications standards, such as D2D, industrial IoT (IMT), C-V2X, and the like. Illustratively, the first UE 104 may include a PLC, and the second UE 104' may include an SA, e.g., of a vehicle.

In certain aspects, the first UE 104 may be configured to may be configured to determine a first set of resources allocated for hybrid automatic repeat request (HARD) feedback associated with sidelink communication. Further, the first UE 104 may be configured to determine that the first set of resources is allocated for scheduling requests (SRs) from a set of UEs.

In some aspects, the first UE 104 may include monitoring component 198a. The monitoring component 198a may be configured to monitor resources on a channel for transmissions from other UE, and the channel may be configured to carry feedback from the other UE responsive to transmissions on a sidelink channel. The first UE 104 may further include a reception component 198b. The reception component 198b may be further configured to receive at least one SR from at least one of the other UE 104' on the resources of the channel configured to carry the feedback based on monitoring the resources on the channel.

Correspondingly, the second UE 104' may be configured to generate the SR based on data associated with sidelink communication. The second UE 104' may also be configured to determine the first set of resources allocated for HARQ feedback associated with the sidelink communication.

The second UE 104' may include a requesting component 199a. The requesting component 199a may be configured to generate the SR to request to transmit at least one of data or control information on a sidelink channel. The second UE 104' may further include a transmission component 199b. The transmission component 199b may be configured to transmit, to the first UE 104, the SR on resources of a channel configured to carry feedback responsive to transmissions on the sidelink channel.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies. Further, although the present disclosure may focus on cellular vehicle-to-everything (C-V2X) communication, the concepts and various aspects described herein may be applicable to other similar areas, such as D2D, IoT, machine-type communication (MTC), or other technologies/protocols and associated standards for communication in wireless/access networks.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
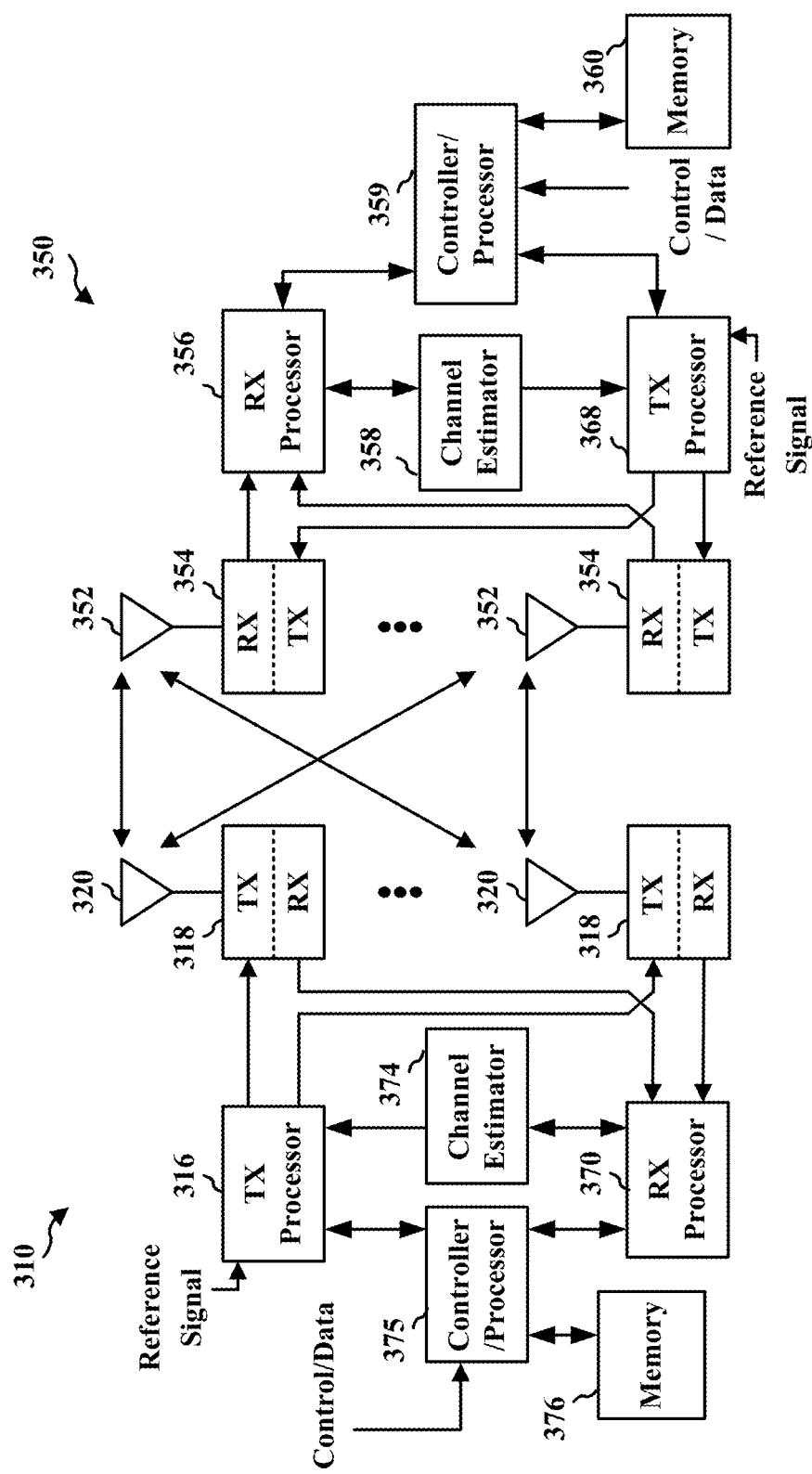
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the monitoring component 198a and/or the reception component 198b, as shown in FIG. 1.

In some other aspects, at least one of the TX processor 368, the RX processor 356, and the controller/processor 359 may be configured to perform aspects in connection with the requesting component 199a and/or the transmission component 199b, as shown in FIG. 1.

Referring to FIGS. 4-13, various techniques and solutions to underutilization of resources in sidelink communication are described. In some telecommunications standards, sidelink communication is configured on a set of resources, which may include a set of slots in the time domain and a set of subchannels in the frequency domain that each spans between 10 and 100 RBs. In a slot configured for sidelink communication, a first set of resources may be configured to carry control information for the sidelink communication, whereas a second set of resources may be configured to carry the data of the sidelink communication. In addition, a third set of resources within the slot may be configured to carry feedback for the sidelink communication.

In some aspects, feedback for sidelink communication may include HARQ feedback. According to HARQ feedback, a UE, may transmit either ACK or NACK feedback based on receiving data and/or control information on a preceding set of resources. Such ACK/NACK feedback may be conveyed using at least one bit.

According to an example RAT, such as 5G NR, the aforementioned third set of resources configured to carry HARQ feedback for sidelink communication may be a physical sidelink feedback channel (PSFCH). The PSFCH may be allocated on one or more subchannels over two symbols of a slot. For each UE that transmits sidelink feedback, the HARQ ACK/NACK may occupy only a single RB (e.g., only one bit may be needed to convey each of ACK or NACK feedback). Thus, multiple resources allocated for the PSFCH may be unused even when HARQ ACK/NACK feedback is carried thereon.

By way of illustration, the PSFCH may be configured on one subchannel, and therefore, between 10 and 100 RBs may be allocated to the resource pool available for sidelink HARQ feedback. As the sidelink HARQ feedback may occupy only a single RB, only between 1% (e.g., for 100 RBs per subchannel) and 10% (e.g., for 10 RBs per subchannel) of the RBs allocated for the PSFCH may be used for a UE to transmit HARQ ACK/NACK feedback in unicast mode. Such percentages demonstrate the clear underutilization of resources allocated for the PSFCH, and this underutilization is amplified (e.g., less than 1% utilization) when the PSFCH is configured on multiple subchannels.

Potentially, multiple UEs may be configured in groupcast mode, and therefore, multiple UEs may be configured to transmit HARQ ACK/NACK feedback on the same PSFCH resources. However, an appreciable amount of PSFCH resources may remain unused while still accommodating for HARQ feedback in groupcast mode. Such allocations that allow for substantial underutilization of resources are wasteful and contribute to overhead and inefficiencies that may adversely impact system performance and user experience.

FIGS. 4-13 illustrate various techniques and solutions to decreasing resource underutilization. In so doing, sidelink communication is improved, for example, by meeting or exceeding QoS parameters established by various RATs and/or enabling some technologies for various RATs, such as C-V2X, IIoT, and the like.

Figure 4:
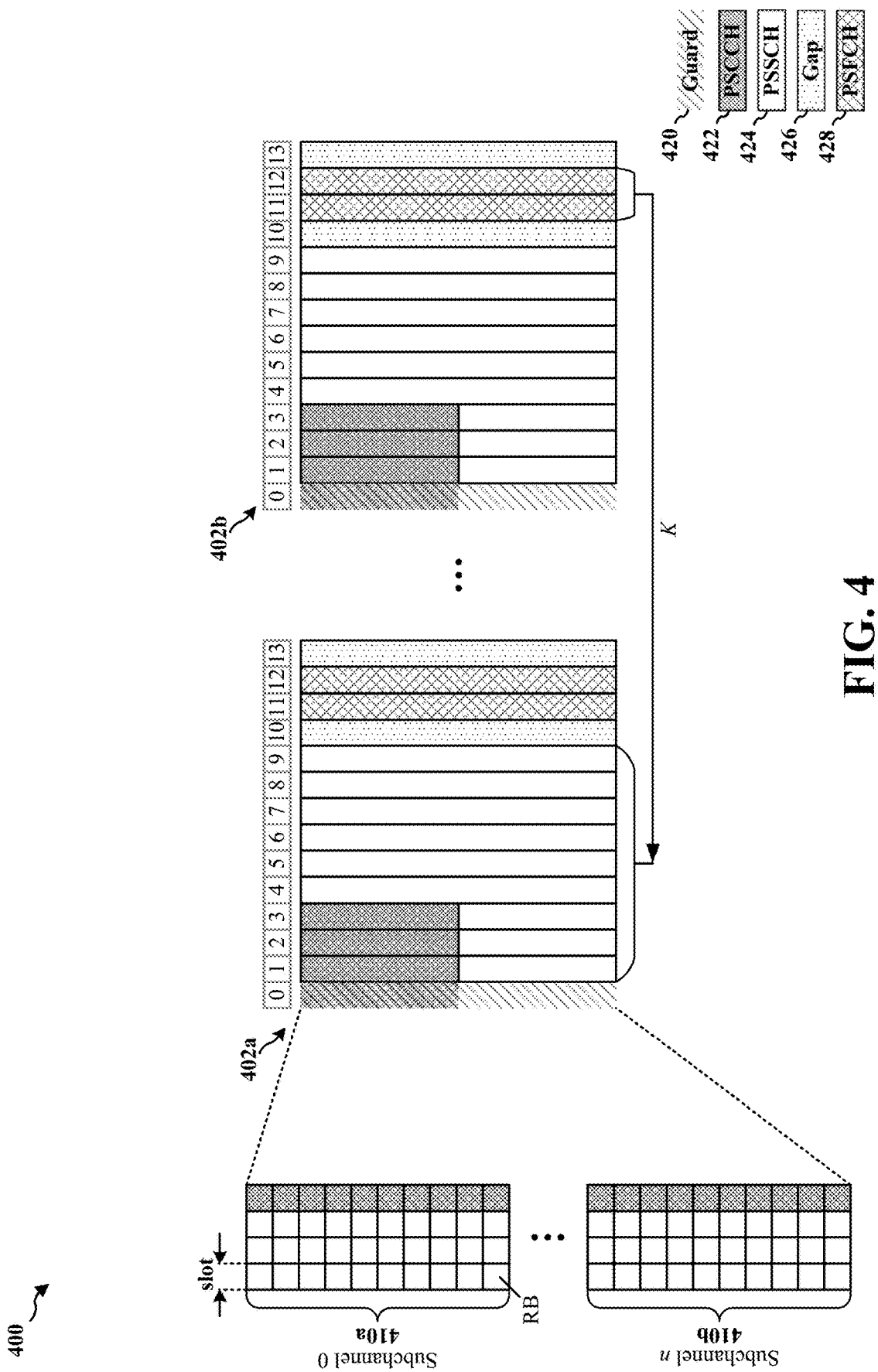
FIG. 4 is a diagram illustrating an example resource configuration for sidelink communication.

Referring to FIG. 4, an example resource configuration 400 for sidelink communication is illustrated. In some aspects, the resource configuration 400 may be employed for V2X (e.g., including C-V2X) and/or similar technologies (e.g., IIoT). As described with respect to FIGS. 2A-D, supra, a resource grid may be used to represent a frame structure. In the time domain, a set of slots 402a-b may be scheduled for sidelink communication (e.g., including C-V2X) within the frame structure. Each of the slots 402a-b may include multiple symbols, such as 14 symbols that may be indexed from 0 to 13 (or indexed 0 to 6 for each of two half-slots within a slot).

In the frequency domain, the example resource configuration 400 for sidelink communication may include a set of subchannels 0-n 410a-b, which may occur in each of the slots 402a-b. As shown, supra, an RB (or PRB) may extend twelve consecutive subcarriers; however, the subchannel size for some sidelink communication technologies (e.g., C-V2X) may be relatively large, having a minimum of ten RBs and a potential maximum of one hundred RBs.

To receive a sidelink packet, a receiver may perform blind decoding in all sidelink subchannels 0-n 410a-b. The number of sidelink subchannels $N_{subchannel}^{SL}$ may be configured via higher layer signalling or may be preconfigured (e.g., fixed by a telecommunications standard). In some aspects, $N_{subchannel}^{SL}$ (e.g. indexed from, 0 through n) may be relatively few, e.g., between one and twenty-seven subchannels, so that blind decoding of all subchannels remains feasible. Regardless, the expectation remains that receivers blindly decode an appreciable amount of RBs to receive a sidelink packet—e.g., while blind decodes of ten RBs is possible, the potential remains for receivers to blindly decode one thousand (or more) RBs for sidelink packet reception.

Referring to an example allocation of the sidelink resource configuration 400, each of slots 402a-b may include a guard period (GP) 420, e.g., which may facilitate switching between different technologies in a wireless communications system, such as a RAN. Potentially, the GP 420 may be optional, such as when slots of the technology are contiguous. For example, the GP 420 may be omitted when the first slot 402a is immediately followed in time by the second slot 402b. In such scenarios, a respective channel allocated on each of the subcarriers 410a-b in the next consecutive (e.g., second) symbol may also be allocated in the preceding (e.g., first) symbol.

Further to the example allocation, the PSCCH 422 and PSSCH 424 may be carried on a set of symbols of each of the slots 402a-b following the GP 420. In another aspect, if the second slot 402b consecutively follows the first slot 402a, then the PSCCH 422 and the PSSCH 424 may be allocated on a set of symbols that begin the second slot 402b (and the GP 420 may be omitted from the second slot 402b). Over the set of symbols (e.g., symbols indexed 0-3 or 1-3) allocated to both the PSCCH 422 and the PSSCH 424, the PSCCH 422 and the PSSCH 424 may each occupy a respective subset of the set of subchannels 0-n 410a-b.

Across a first set of symbols (e.g., indexed 1-3) of the slots 402a-b, the PSCCH 422 may occupy up to one subchannel, with the one subchannel corresponding to the lowest subchannel index. For example, the PSCCH 422 may occupy the first subchannel 0 410a over a set of symbols following a GP 420 symbol or over a set of symbols beginning the slots 402a-b. The PSCCH 422 may be absent from all subchannels 0-n 410a-b over the remaining symbols (e.g., symbols indexed 4-13) of the slots 402a-b.

The PSCCH 422 may carry sidelink control information (SCI), which may be configured into two stages (e.g., 1-A, 2-A). In some aspects, SCI associated with the first stage may be carried in the PSCCH 422 including information about the bandwidth of the PSSCH 424 and resource reservations for future slots. Further, SCI associated with the second stage may be found and decoded after decoding the PSCCH 422. A source identifier (ID) and a destination ID may be carried in a packet (e.g., including SCI), and may be used to determine whether the packet is intended for the receiver (e.g., receiving UE), as well as determine which transmitter (e.g., transmitting UE) transmitted the packet.

While the PSCCH 422 may carry SCI, the PSSCH 424 may carry sidelink data. In some aspects, the PSCCH 422 may overlap in time with the PSSCH 424 across the first set of symbols, such as symbols indexed 1-3 if the GP 420 is present or indexed 0-3 if the GP 420 is absent. However, the PSCCH 422 and the PSSCH 424 may not overlap in the frequency domain. When overlapping in time with the PSCCH 422, the PSSCH 424 may occupy subchannels up to $N_{Subchannel}^{SL}$ contiguous subchannels. When non-overlapping in time with the PSCCH 422, the PSSCH 424 may occupy $N_{subchannel}^{SL}$ (e.g., subchannel 1 through subchannel n 410b).

According to some sidelink communication technologies, a feedback mechanism may be configured in order to indicate successful or unsuccessful reception of transmissions. For example, C-V2X and IIoT sidelink communication may support HARQ feedback on a PSFCH 428, which may be configured on two symbols (e.g., indexed 11-12) of each of the slots 402a-b on which the PSFCH 428 is enabled. In some aspects, the two symbols may carry repetitive information—that is, one symbol of the PSFCH 428 may be a repetition of the other symbol of the PSFCH 428.

The PSFCH 428 may be consecutively preceded and succeeded by a gap 426 (e.g., indexed 10 and 13). In other words, the PSFCH 428 may be contiguous with respective leading and following gap 426 symbols. At least one of the gap 426 symbols may provide a time period for a UE to switch between a receiving mode and a transmitting mode, or vice versa. For example, a UE may be able to receive information on the PSCCH 422 and the PSSCH 424 and then transmit HARQ feedback on the PSFCH 428 because the UE is able to switch transceiver circuitry from a receive mode (e.g., RX chain) to a transmit mode (e.g., TX chain) during the gap 426 preceding the PSFCH 428.

According to various aspects, HARQ feedback on the PSFCH 428 can be enabled for unicast and groupcast (e.g., enabled via higher layer signalling). HARQ feedback may be conveyed on the PSFCH 428 as a one-bit value corresponding to ACK/NACK feedback for unicast. For groupcast, however, HARQ feedback may be conveyed on the PSFCH 428 according to one of two options: (1) NACK-only; or (2) ACK or NACK.

Various parameters of the PSFCH 428 may be configured or may be preconfigured for UEs engaging in sidelink communication. For example, a base station (e.g., gNB) may configure some parameters for sidelink communication and/or another UE may configure some other parameters for sidelink communication. Such parameters may include a periodicity, a minimum time gap, a number of multiplexing cyclic shifts (CSs), and/or a set of resources allocated to the PSFCH 428.

With respect to the periodicity, a UE may be configured with the slots in which the PSFCH 428 occurs. In some aspects, the periodicity may be configured from a predetermined set of periodicities—e.g., the periodicity of the PSFCH 428 may be zero, one, two, or four. A periodicity of one, however, may configure the absence of the PSFCH 428; that is, the PSFCH 428 may be configured to not occur by configuring the PSFCH periodicity to 0. A periodicity of one may configure the PSFCH 428 to occur in every slot, a periodicity of two may configure the PSFCH 428 to occur in every other slot, and a periodicity of four may configure the PSFCH 428 to occur in every fourth slot.

In some sidelink communication technologies, the PSFCH 428 may not carry HARQ feedback for information in the same slot—e.g., the PSFCH 428 of the first slot 402*a* may not carry HARQ feedback for data on the PSSCH 424 in earlier symbols of the first slot 402*a*. Rather, the PSFCH 428 may carry HARQ feedback for information (e.g., data on the PSSCH 424) on an earlier slot, which may correspond to a value K that is set according to a minimum time gap parameter. In some aspects, K may be configured from a predetermined set of minimum time gaps—e.g., the minimum time gap of the PSFCH 428 may be two or three.

By way of illustration, one slot may occur between the first slot 402*a* and the second slot 402*b*—e.g., the first slot 402*a* may be indexed i and the second slot 402*b* may be indexed i+2, so a slot indexed i+1 consecutively follows the first slot 402*a*. Thus, in order to configure the PSFCH 428 of the i+2$^{th}$ slot 402*b* to carry HARQ feedback for the data on the PSSCH 424 of the i$^{th}$ slot 402*a*, the minimum time gap K may be configured to be equal to two. Similarly, if the i$^{th}$ slot 402*a* were consecutively followed by two slots i+1 and i+2, then K would be configured equal to 3 in order for the PSFCH 428 of the i+3$^{th}$ slot 402*b* to carry HARQ feedback for the data on the PSSCH 424 of the i$^{th}$ slot 402*a*.

In order for different information carried in the PSFCH 428 to be transmitted with orthogonality, a valid number of CSs may be applied to the PSFCH transmission. Twelve CSs may be supported as CS pairs. For example, the valid number of multiplexing CSs may be {1, 2, 3, 4, 6}. Potentially, however, a PSFCH transmission may not have a CS applied thereto.

While the resource configuration 400 illustrates an example resource allocation for the PSFCH 428, the PSFCH 428 may be scheduled on different resources in different aspects. In some aspects, the resources on which the PSFCH 428 is scheduled may be preconfigured. In some other aspects, the resources on which the PSFCH 428 is scheduled may be configured, e.g., via higher layer signalling (e.g., rbSetPSFCH). For example, an information element or other signaled value (e.g., via RRC signalling) may carry a bitmap that conveys the resource allocation for the PSFCH 428.

According to some aspects, the HARQ feedback on the PSFCH 428 may be mapped to one RB. Thus, while higher layer signalling may configure a resource pool having multiple PRBs assigned to the PSFCH 428 (e.g., rbSetPSFCH may configure the PSFCH resource pool), the substantive information (e.g., HARQ ACK/NACK) carried on the PSFCH 428 may occupy only RB of the multiple RB resource pool reserved for the PSFCH 428.

As the HARQ feedback may occupy a single RB, a UE should identify that single RB when providing HARQ feedback, e.g., in response to receiving data on the PSSCH 424 in an earlier slot. The UE may determine the candidate RBs allocated to the PSFCH 428 within a resource pool identified as subchannel j and slot i (e.g., PSSCH slot i). The slot i may be determined by the periodicity of the PSFCH, and effectively may be constrained thereby—e.g., 0≤i<$N_{PSFCH}$. The number of candidate RBs $M_{subcarrier,slot}$ may be a function of the number of RBs allocated to the PSFCH resource pool by the higher layer signalling, the periodicity of the PSFCH 428, and the number of sidelink subchannels, as shown in Equation 1.

$$M_{subcarrier,slot} = \frac{\#rbSetPSFCH}{(periodPSFCH * numSubChannel)} \quad \text{Equation 1}$$

From the number of candidate RBs, the UE may determine the RBs of the resource pool for the PSFCH 428. The RBs of the PSFCH resource pool may be further based on the periodicity, the subchannel j, and the slot i. For example, the candidate RBs of the PSFCH resource pool may be given by Equation 2.

$$(i+jN_{PSFCH}) \cdot M_{subcarrier,slot} \text{ to } (i+1+jN_{PSFCH}) \cdot M_{subcarrier,slot} - 1 \quad \text{Equation 2}$$

By way of illustration, given $N_{PSFCH}$=2 and $M_{subcarrier,slot}$=5, j=0, then the candidate RBs according to Equation 2 may be RBs [0, 4] for i=0 and RBs [5, 9] for i=1.

Illustratively, given $N_{PSFCH}$=2 and $M_{subcarrier,slot}$=5, j=0, then the candidate RBs according to Equation 2 may be RBs [0, 4] for i=0 and RBs [5, 9] for i=1.

In addition, the UE may determine resources for multiplexing on the PSFCH 428 as R=$N_{type} \cdot M_{subcarrier,slot}$ #CS. To determine those resources R for multiplexing, $N_{type}^{PSFCH}$ may be given by higher layer signalling and, if equal to 1, PRBs are associated with the starting subchannel of the PSSCH 424 to which the HARQ feedback on the PSFCH 428 corresponds. Otherwise, $N_{type}^{PSFCH}$ may be equal to the number of subchannels on which the PSSCH is configured, and the PRBs are associated with one or more subchannels of the PSSCH 424 to which the HARQ feedback on the PSFCH 428 corresponds.

The UE may select one RB out of the available PSFCH resource pool according to $(P_{ID}+M_{ID})\% R$, where $P_{ID}$ is the ID of the transmitter (e.g., ID of the transmitting UE) and $M_{ID}$ is the receiver ID (e.g., ID of the receiving UE) for groupcast of SCI 2-A and $M_{ID}$=0 otherwise. Once the UE has determined an RB of the PSFCH 428 to carry HARQ feedback, the UE may duplicate the HARQ feedback in the contiguous OFDM symbol allocated to the PSFCH 428 (e.g., the preceding OFDM symbol).

In addition to selecting the RB to carry the HARQ feedback on the PSFCH 428, the UE may determine a sequence to convey the HARQ feedback. Specifically, the HARQ feedback on the PSFCH 428 may be based on a Zadoff-Chu (ZC) sequence. The UE may determine (e.g., generate) a ZC sequence transmission according to a group and sequence number. The ZC group number u may be based on a PSFCH hopping configuration, which may be configured according to higher layer signalling, such as an information element or other signalling (e.g., sl-PSFCH-HopID-r16, sl-PSFCH-HopID-r17, etc.). In some aspects, the UE may further determine the ZC sequence transmission using CS hopping, which may be determined by Equation 3.

$$a_l = \frac{2\pi}{12}((m_0 + m_{CS} + n_{CS}(n_{s,f}^u, l+l'))\%12) \quad \text{Equation 3}$$

The variables of the foregoing Equation 3 may depend on the supported CS pairs, the HARQ mode, the slot number, and/or symbol index of the PSFCH. In particular, $m_0$ may depend on the PSFCH configuration of the supported CS pairs, $m_{CS}$ may depend on the value of the ACK/NACK feedback and the HARQ mode (e.g., NACK-only or ACK/NACK), and $n_{CS}(n_{s,f}^\mu, l+l')$ may be a function the depends on the slot number and symbol index of the PSFCH 428.

Thus, a receiving UE may be configured to provide HARQ feedback to a transmitting UE by selecting an RB, determining a ZC sequence transmission (potentially with a valid CS applied thereto) to convey HARQ feedback on the selected RB, and duplicating the determined ZC sequence transmission on a contiguous symbol of the PSFCH 428, as described according to the foregoing. However, an appreciable number of the candidate resources determined for the PSFCH resource pool may remain underutilized, which may contribute to inefficiencies and wastefulness in sidelink communication, such as C-V2X.

Figure 5:
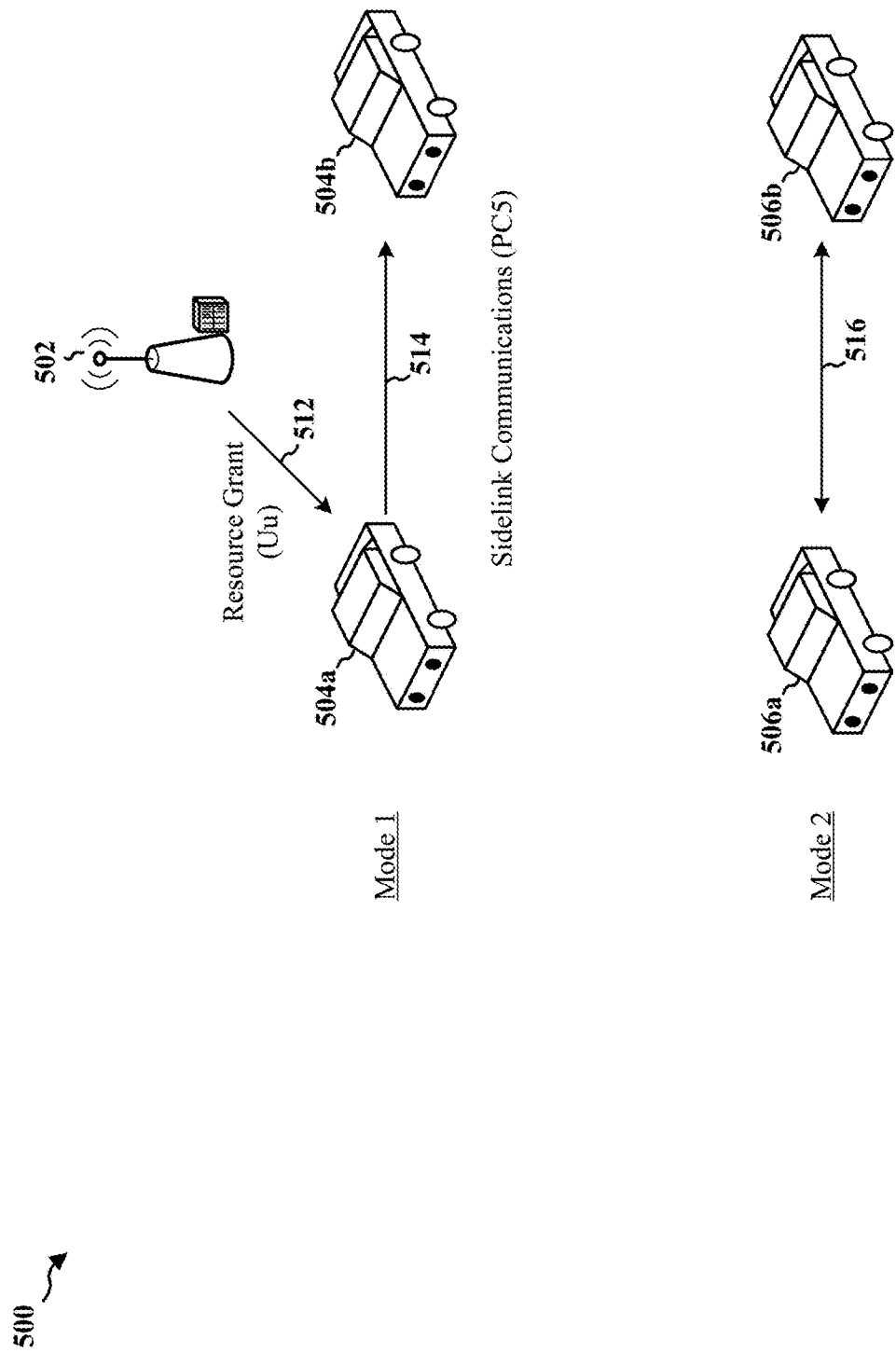
FIG. 5 is a diagram illustrating example modes of sidelink communication.

Relatedly, FIG. 5 is a block diagram that illustrates an example sidelink communication environment 500. For example, the environment 500 may include a base station 502 (e.g., gNB and/or mmW base station), and a plurality of UEs 504*a-b*, 506*a-b*. Each of the 504*a-b*, 506*a-b* may be configured for a sidelink communication technology, such as C-V2X.

In some aspects, resources for V2X may be allocated in one of two different ways—e.g., Mode 1 and Mode 2. Mode 1 and Mode 2 may be configured for transmitting UEs (e.g., the first UE 504*a* and the third UE 506*a*), whereas receiving UEs (e.g., the second UE 504*b* and the fourth UE 506*b*) may operate substantially similarly regardless of Mode 1 or Mode 2 configuration.

In Mode 1, the base station 502 may be configured to assign transmission resources for sidelink communication through DCI, and specifically, DCI of a particular format, such as DCI 3_0. Thus, the base station 502 may transmit a resource grant 512 to a first UE 504*a* (e.g., transmitting UE) via the Uu interface, which may be the radio interface between the RAN and the UE 504*a*.

The first UE 504*a* may then transmit a sidelink transmission 514 to the second UE 504*b* (e.g., receiving UE) via the PC5 interface, which may be the direct communication interface. According to Mode 1, the UEs 504*a-b* may support dynamic grants (DGs), and configured grants (CGs) type 1/type 2. In some aspects, the base station 502 may activate CG type 1 via RRC signalling, e.g., to the first UE 504*a*. For example, the first UE 504*a* may transmit the sidelink transmission 514 based on the CG type 1.

Furthermore, the base station 502 may transmit DCI 3_0 in order to configure time and frequency resources, as well as indicate transmission timing, e.g., to the first UE 504*a* for the sidelink transmission 514. In addition, the base station 502 may configure limits for a modulation and coding scheme (MCS) used for sidelink transmissions; however, the first UE 504*a* may determine the MCS to use for the sidelink transmission 514 (within the limit configured by the base station 502).

In Mode 2, the third UE 506*a* (e.g., transmitting UE) may perform channel sensing by blindly decoding all PSCCH channels in order to identify resources already reserved by other sidelink transmissions. The third UE 506*a* may then determine the available resources based on the identified reserved resources. Subsequently, the third UE 506*a* may transmit a sidelink transmission 516 to the fourth UE 506*b* based on the determined available resources. Within the third UE 506*a*, blind decoding and/or identification of reserved resources may be performed at relatively lower layer(s), such as the PHY, MAC, and/or RLC, whereas the determination of the available resources may be performed at relatively higher layer(s), such as RRC, SDAP, and/or PDCP.

Figure 6:
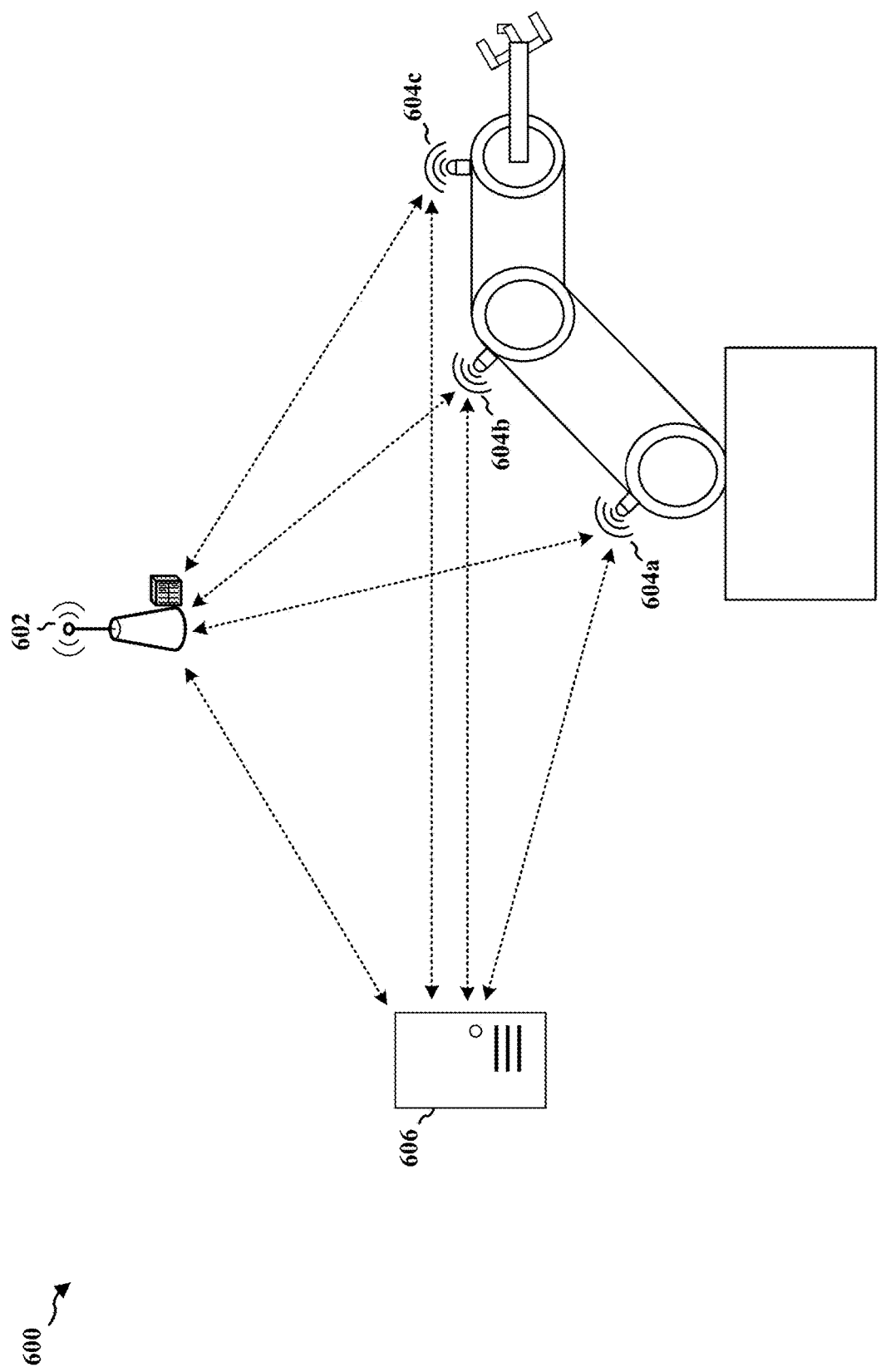
FIG. 6 is a diagram illustrating an example sidelink communications environment.

FIG. 6 is a block diagram that illustrates another example sidelink communication environment 600. In the example environment 600, a PLC 606 and a set of SAs 604*a*, 604*b*, 604*c* may directly communicate on wireless channel(s), which may facilitate flexible and uncomplicated sidelink deployments, e.g., for some use cases including IIoT, ultra-reliable low-latency communication (URLLC), and/or other similar use cases (e.g., mission critical).

In some aspects, the PLC 606 may control between twenty to fifty SAs, such as the SAs 604*a*, 604*b*, 604*c*, some or all of which may be subject to relatively stringent and high-speed imperatives. For example, the PLC 606 and the SAs 604*a*, 604*b*, 604*c* may adhere to low latency conditions of approximately 1-2 ms and/or ultra-reliability conditions of $10^{-6}$ error rate. While a base station 602 (e.g., gNB) may be capable of controlling the SAs 604*a*, 604*b*, 604*c* and/or PLC 606, communication through the base station 602 may involve multiple over-the-air (OTA) transmissions, potentially through multiple devices (e.g., small cells, relays, other UEs, etc.). Consequently, signalling through the base station 602 (e.g., to control SAs 604*a*, 604*b*, 604*c*) may be insufficient to meet various latency and/or reliability conditions, which may be imposed upon the SAs 604*a*, 604*b*, 604*c* by IIoT and/or URLLC use cases.

With respect to sidelink communication for IIoT, traffic frequently may be deterministic with a relatively small packet size, such as 32-356 bytes. Furthermore, the necessary bandwidth may be relatively low—e.g., 2 RBs may be sufficient for some use cases and/or sidelink communication. However, the overall bandwidth available for IIoT may be relatively large, and may include multiple dedicated frequency bands and/or unlicensed frequency bands.

Each of the SAs 604*a*, 604*b*, 604*c* may be constrained by respective UE capabilities, e.g., with respect to bandwidth and/or processing power. However, the SAs 604*a*, 604*b*, 604*c* may not need to detect/monitor all transmissions. Rather, the SAs 604*a*, 604*b*, 604*c* may only need to detect/monitor PSCCH transmissions at first, which may inform the SAs 604*a*, 604*b*, 604*c* of where to find PSSCH transmissions.

In IIoT and URLLC use cases, PSCCH transmissions may need to adhere to strict conditions, e.g., as illustrated in the foregoing examples. Thus, IIoT and/or URLLC communications may benefit from feedback mechanisms that indicate ACK/NACK for PSCCH transmissions.

Figure 7:
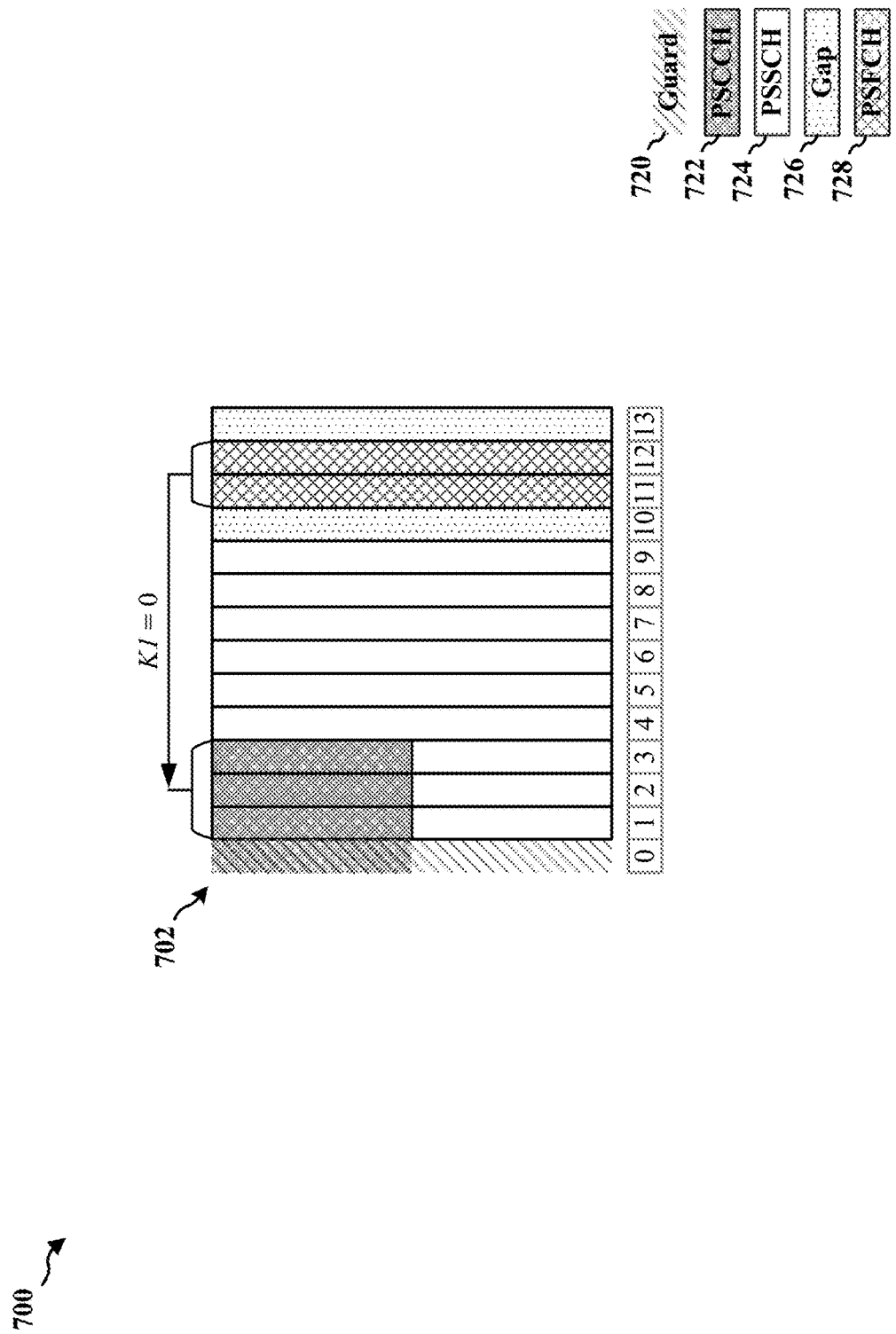
FIG. 7 is a diagram illustrating another example resource configuration for sidelink communication.

Referring to FIG. 7, a block diagram illustrates an example resource configuration 700 for implementing feedback mechanisms for a sidelink control channel. In some aspects, the slot 702 may implement a self-contained slot, e.g., as some information and the HARQ feedback for that information are contained in the same slot. Implementation of the slot 702 as a self-contained slot may depend on UE capability of UEs configured to communicate in the slot 702.

In a slot 702 of the example configuration 700, a GP 720 may be followed by the PSCCH 722 on a first subset of subchannels (e.g., up to one subchannel, which may be the lowest indexed subchannel) and the PSSCH 724 on a second subset of subchannels (e.g., all subchannels except for the lowest indexed subchannel). After the PSCCH 722 ends in the time domain, the PSSCH 724 may occupy all subchannels for the next consecutive set of symbols until a first gap 726 symbol.

The resource configuration 700 may then include the PSFCH 728 on two consecutive symbols (consecutively followed by another gap 726 symbol). As PSCCH transmissions may need to adhere to low latency and/or ultra reliability conditions commensurate with IIoT and/or URLLC, the PSFCH 728 may be configured to carry HARQ feedback for control information, e.g., in addition to (or, potentially, instead of) HARQ feedback for data on the PSSCH 724.

Specifically, the PSFCH 728 may be configured to carry HARQ feedback for the PSCCH 722 in the same slot 702. As the PSCCH 722 may be scheduled relatively earlier in the slot 702 (e.g., on symbols indexed 1-3), while the PSFCH 728 may be scheduled relatively later in the slot 702 (e.g., on symbols indexed 11-12), a UE may be allotted a sufficient amount of time to decode control information on the PSCCH 722 and generate HARQ feedback for the PSFCH 728 in the same slot 702. For example, HARQ feedback on the PSFCH 728 may be provided to SCI 0_1/0_2.

The gap 726 may further facilitate this turnaround by the UE, such that the UE is allotted a sufficient time period to switch from reception mode (e.g., an RX chain and/or other RX circuitry) to transmission mode (e.g., a TX chain and/or other TX circuitry). Potentially, the gap 726 consecutively preceding the PSFCH 728 may be span multiple OFDM symbols to increase the processing time available to a UE. For example, one of more of the PSSCH 724 symbols consecutively preceding the gap 726 symbol may instead be allocated as additional gap 726 symbols.

In order to configure HARQ feedback on the PSFCH 728 for the PSCCH 722 in the same slot 702, the time gap K may be configured to a specific value, which may be predetermined. For example, a time gap K (e.g., K1) of 0 may be configured to indicate HARQ feedback on the PSFCH 728 is for the PSCCH 722 in the same slot 702.

In some aspects, a base station (e.g., gNB) and/or PLC (e.g., other UE) may transmit configuration information to a UE (e.g., SA), and the configuration information may include a value for the time gap K1 of 0. In the context of FIG. 6, for example, the base station 602 and/or PLC 606 may transmit, to the SAs 604a, 604b, 604c, configuration information including a time gap K1 of 0. The PLC 606 may transmit, to one or more of the SAs 604a, 604b, 604c, control information (e.g., SCI) on the PSCCH 722 of the slot 702 (e.g., in symbols indexed 1-3).

Correspondingly, the one or more SAs 604a, 604b, 604c may receive the control information (e.g., SCI) on the PSCCH 722 of the slot 702. The one or more SAs 604a, 604b, 604c may decode the control information and may determine HARQ feedback based on decoding the control information. For example, the one or more SAs 604a, 604b, 604c may determine a HARQ ACK when the control information is successfully decoded, or may determine a HARQ NACK when the control information is unsuccessfully decoded.

Subsequently, the one or more of the SAs 604a, 604b, 604c may transmit the HARQ ACK/NACK on the PSFCH 728 of the slot 702 in a set of symbols (e.g., indexed 11-12), e.g., in order to indicate whether the control information on the PSCCH 722 of the slot was successfully received and decoded. In some aspects, one or more of the SAs 604a, 604b, 604c may use a valid CS to transmit a HARQ ACK/NACK, e.g., for multiplexing. The PLC 606 may receive the HARQ ACK/NACK on the PSFCH 728 in the slot 702, and may determine whether to retransmit the control information based on the HARQ ACK/NACK. For example, the PLC 606 may retransmit the control information on the PSCCH 722 of a later slot (e.g., next consecutive slot) to one of the SAs 604a, 604b, 604c from which a HARQ NACK was received.

Figure 8:
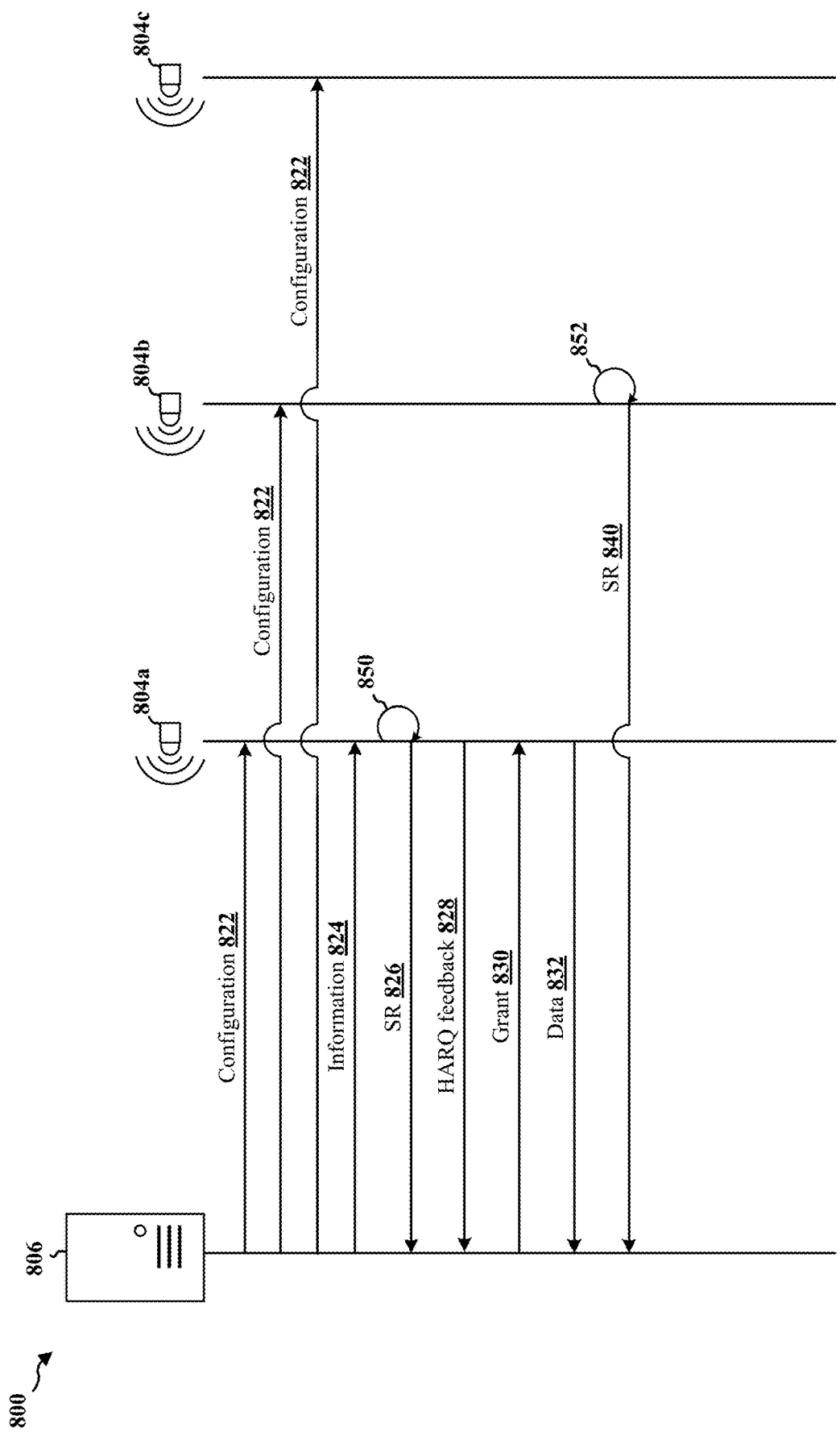
FIG. 8 is a call flow diagram illustrating example operations for sidelink communication.

Referring to FIG. 8, a call flow diagram illustrates an example sidelink communications environment 800, including a set of UEs 804a, 804b, 804c, 806. The UEs 804a, 804b, 804c, 806 may be configured for sidelink communications, such communications according to C-V2X, IIoT, URLLC, and/or other technologies and use cases. For reference, and without limitation, one UE 806 may be referred to as a PLC, and the other UEs 804a, 804b, 804c may be referred to as SAs.

While FIG. 8 illustrates three SAs 804a, 804b, 804c, the number of SAs may be substantially greater than three—e.g., the PLC 806 may be configured for sidelink communication with more than ten SAs, more than one hundred SAs, or even more than one thousand SAs. In some aspects, the PLC 806 may configure communication with the SAs 804a, 804b, 804c as unicast. In some other aspects, the PLC 806 may configure communication with the SAs 804a, 804b, 804c as groupcast, e.g., with up to sixty SAs per subchannel on each of the $N_{subchannel}^{SL}$ sidelink subchannels.

Each of the SAs 804a, 804b, 804c may be configured to transmit data (e.g., to the PLC 806) based on a respective grant, which may indicate a set of allocated resources on which one of the SAs 804a, 804b, 804c may transmit data. The PLC 806 may be configured to allocate respective sets of resources to each of the SAs 804a, 804b, 804c for the respective grants. In some aspects, the PLC 806 may allocate a set of resources for one of the SAs 804a, 804b, 804c by polling each of the SAs 804a, 804b, 804c, and a response to the polling from one of the SAs 804a, 804b, 804c may indicate to the PLC 806 that the responding one of the SAs 804a, 804b, 804c has data to transmit to the PLC 806.

Potentially, polling by the PLC 806 may incur an appreciable amount of overhead, e.g., with respect to time. In particular, configuring grants for SAs 804a, 804b, 804c based on polling may be inefficient and/or insufficient to satisfy some low latency use cases, such as URLLC, mission critical, and the like. The time consumed by polling SAs may proportionally increase with the number of SAs in the system. For example, the up to 60 SAs may be configured per subchannel, and so polling all SAs may cause delays to those having urgent data to transmit to the PLC 806.

However, polling may be avoided by configuring SAs to inform the PLC 806 of when an SA has data to transmit. The PLC 806 may then allocate resources for that SA having data to transmit and, accordingly, that SA may transmit the data based on the resource allocation. Specifically, each of the SAs 804a, 804b, 804c may be configured to use a respective SR, which informs the PLC 806 of an SA having data to transmit. Thus, the SAs 804a, 804b, 804c may explicitly inform the PLC 806 of an impending data transmission rather than wait to be polled and, in so doing, latency of sidelink communications may be reduced (e.g., for urgent sidelink traffic).

In some other aspects, however, the PLC 806 may allocate a set of resources for one of the SAs 804a, 804b, 804c based on an SR received therefrom; the PLC 806 may then transmit the grant indicating the resource allocation to the one of the SAs 804a, 804b, 804c from which the SR was received. In order to reduce underutilization of resources and/or latency in the environment 800, the SR may be carried on a channel associated with HARQ feedback. For example, referring to FIG. 4, the PSFCH 428 may be configured to carry HARQ feedback from each of the SAs 804a, 804b, 804c, and may be further configured to carry SRs from each of the SAs 804a, 804b, 804c.

In practice, each of the SAs 804a, 804b, 804c may be configured to initiate a respective SR based on arrival of at least one packet from a higher layer (e.g., application, RRC, SDAP, and/or PDCP layer). For example, at each of the SAs 804a, 804b, 804c, initiation and generation of an SR may be performed at a relatively lower layer, such as one or more L2 layers (e.g., the MAC layer) and/or L1 layer, when the SA has data to transmit, as indicated by arrival of the at least one packet from the higher layer(s). Each of the SAs 804a, 804b, 804c may then be able to transmit the respective SR on a PSFCH at the next available PSFCH occasion, which may be occur according to the configured PSFCH periodicity.

According to various aspects, the PLC 806 may transmit configuration information 822 to each of the SAs 804a, 804b, 804c that is configured for sidelink communications with the PLC 806. In some aspects, the configuration information 822 may be transmitted to each of the SAs 804a, 804b, 804c via RRC signalling. In some other aspects, the configuration information 822 may include, inter alia, control information (e.g., SCI 0_1/0_2, SCI 1-A, 2-A) carried on a sidelink control channel. For example, referring to FIGS. 4 and 7, the configuration information may include control information carried on the PSCCH 422 in the first slot 402a and/or PSCCH 722 in the slot 702.

The configuration information 822 may be transmitted in one or more messages. Potentially, the PLC 806 may transmit separate messages of the one or more messages differently—e.g., a first message including one portion of the configuration information 822 may be transmitted via RRC signalling, whereas a second message including another portion of the configuration information 822 may be transmitted via groupcast signalling.

The PLC 806 may include information associated with the PSFCH in the configuration information 822. In some aspects, the configuration information 822 may include information for transmitting, to the PLC 806, HARQ feedback on the PSFCH. In some other aspects, the configuration information 822 may include information for transmitting an SR to the PLC 806.

For example, the configuration information 822 may include a periodicity of the PSFCH, a minimum time gap (e.g., value of K) of the PSFCH, a number of multiplexing CSs, supported or valid CS pairs for a PSFCH transmission, and/or a set of resources allocated to the PSFCH (e.g., rbSetPSFCH). In some aspects, the configuration information 822 may indicate a value for a time gap (e.g., value for K or K1) configuring the PSFCH to carry HARQ feedback for a PSCCH of the same slot. For example, the configuration information 822 may include a value of K or K1 equal to 0, which configures the SAs 804a, 804b, 804c to report HARQ feedback on the PSFCH for control information (e.g., SCI) on the PSCCH of the same frame (e.g., as described with respect to FIG. 7, supra).

As described herein, information on the PSFCH may be conveyed based on a ZC sequence. For example, as further detailed infra, an SR may be conveyed using a preamble that is based on a ZC sequence. The PLC 806 may include, in the configuration information 822, information associated with valid preambles to be used with the PLC 806. For example, the configuration information 822 may indicate the number of available preambles, the supported preamble indexes or IDs, a default or unique preamble index or ID, a set of supported preambles, and/or other information associated with conveying a respective SR to the PLC 806 for each of the SAs 804a, 804b, 804c.

In order to increase the capacity on the PSFCH, valid CSs may be applied to preambles, e.g., so that the PLC 806 is able to different multiple SRs on the PSFCH from the SAs 804a, 804b, 804c. Thus, the PLC 806 may include, in the configuration information 822, information indicating the valid CSs, e.g., including valid CS pairs. In some aspects, the PLC 806 may communicate with one or more base stations and/or UEs (e.g., neighboring PLCs) to determine (e.g., negotiate) the configuration of preambles, such as a starting root ZC sequence index.

Each of the SAs 804a, 804b, 804c may receive the configuration information 822 from the PLC 806. Subsequently, one or more of the SAs 804a, 804b, 804c may determine data to transmit to the PLC 806 on a sidelink channel—e.g., at least one of the SAs 804a, 804b, 804c may generate data for at least one of IIoT, C-V2X, URLLC, and/or other technology or use case. Illustratively, the first SA 804a may obtain at least one packet, which may include data 832 from a higher layer for transmission to the PLC 806.

The first SA 804a may be configured to generate an SR 826 in order to obtain a grant for transmission of the data 832. The first SA 804a may be further configured to transmit, to the PLC 806, the SR 826 on the PSFCH, e.g., based on the configuration information 822. In the context of FIGS. 4 and 7, the first SA 804a may transmit the SR 826 on a set of resources within the PSFCH 428 in at least one of the slots 402a-b and/or on a set of resources within the PSFCH 728 in the slot 702.

While HARQ feedback does not necessarily need to be carried on the PSFCH in order for an SR to be conveyed thereon, the SAs 804a, 804b, 804c may be configured to transmit HARQ feedback on the PSFCH of the same slot in which an SR is also transmitted. For example, the PLC 806 may transmit data and/or control information 824 to the first SA 804a, and the first SA 804a may generate HARQ feedback 828 based on receiving the information 824. The first SA 804a may then transmit the HARQ feedback 828, which may be NACK-only or ACK/NACK feedback, to the PLC 806 on the PSFCH based on the received information 824.

According to a first configuration of PSFCH SR transmission, the PSFCH may be allocated on a set of resources that may be divided into two subsets: a first subset of PSFCH resources may be allocated to HARQ feedback, whereas a second subset of PSFCH resources may be allocated to carry SRs. The first and second subsets of PSFCH resources may be non-overlapping in the frequency domain; however, both the first and second subsets of resources may occur on all (e.g., both) PSFCH symbols.

The SAs 804a, 804b, 804c may be configured to provide HARQ feedback on the first subset of PSFCH resources, e.g., as described supra, with the reduction to the resource pool (in the frequency domain) available for HARQ feedback being the primary difference. Effectively, the SAs 804a, 804b, 804c may generate and transmit HARQ feedback in a manner that is substantially agnostic to the allocation of PSFCH resources to SRs, e.g., except that the number of candidate RBs $M_{subcarrier,slot}$ may be reduced as a consequence the frequency-domain partitioning of the PSFCH.

Illustratively, the second subset of PSFCH resources may be configured as a resource pool for an SR similar to a random access channel (RACH) resource pool for a RACH preamble. Thus, SAs 804a, 804b, 804c may convey SRs as preambles based on ZC (root) sequences.

Referring to FIG. 9, for example, a block diagram illustrates an example resource configuration 900 in which the resources allocated to the PSFCH 928 are divided into a first subset of SR resources 904 and a second subset of HARQ resources 906 configured to carry SRs and HARQ ACK/NACK feedback, respectively. For example, the first SA 804a may transmit the SR 826 on the SR resources 904 of the PSFCH 928, and may concurrently transmit the HARQ feedback 828 on the HARQ resources 906 of the PSFCH 928 in the same slot 902.

In the time domain, the two symbols (e.g., symbols indexed 11-12) may be allocated to the PSFCH 928 in slot i 902. The SR resources 904 and the HARQ resources 906 may both occur on the same symbols of slot i 902. In the frequency domain, however, the SR resources 904 and the HARQ resources 906 may be non-overlapping. For example, the HARQ resources 906 may include a subchannel j 910a, whereas the SR resources 904 may include another subchannel m 910b absent from the HARQ resources 906.

Illustratively, in the example configuration 900, a number of RBs $M_{PRACH}^{PSFCH}$ may be allocated for PRACH. An SR may be conveyed as a preamble, which may be based on a sequence. For example, the sequence may have a length equal to $12 \cdot M_{PRACH}^{PSFCH}$, and support $12 \cdot M_{PRACH}^{PSFCH} - 1$ root ZC sequences. For each root sequence, a CS between sequences $C_v$ may be valid to maintain orthogonality. In relation to CSs on the Uu, for example, $C_v$ may be relatively smaller, e.g., because the distance between sequences is smaller and the SAs 804a, 804b, 804c are synchronized with the PLC 806 when transmitting SRs (instead of unsynchronized, as during PRACH transmission).

The number of sequences per root ZC sequence $M_v$ may be a function of the sequence length and $C_v$. For example, the number of sequences per root ZC sequence may be equal to the floor of the quotient of the sequence length divided by $C_v$, as shown in Equation 4.

$$M_v = \left\lfloor \frac{12 \cdot M_{PRACH}^{PSFCH}}{C_v} \right\rfloor \quad \text{Equation 4}$$

In total, an number of preambles $N_{preambles}^{PSFCH}$ may be available to convey an SR, as shown in Equation 5. For example, 1770 preambles may be available for 5 RBs and $C_v=2$. This number of preambles may be sufficient to provide for orthogonality in conveying SRs both between the SAs 804a, 804b, 804c and the PLC and between neighboring sidelink transmissions.

$$N_{preambles}^{PSFCH} = (12 \cdot M_{PRACH}^{PSFCH} - 1) \cdot M_v$$

In some aspects of the aforementioned first configuration of PSFCH SR transmission, the PLC 806 may support a subset of preambles to convey SRs. The number of the supported preambles subset $N_{PA,PLC}$ may be determined by the higher layer(s) of the PLC 806. For example, number of the supported preambles subset $N_{PA/PLC}$ may be based on one or more parameters, such as the size of a UE group (e.g., the number of the SAs 804a, 804b, 804c configured for groupcast), the resource pool size of the RACH-like SR resources 904, neighboring PLCs (e.g., negotiation with neighboring UEs), and/or other factors.

The PLC 806 may support a set of preamble indexes, e.g., upon which the subset of preambles may be based. For example, each of the SAs 804a, 804b, 804c may be configured to generate a preamble within the subset supported by the PLC 806 based on a set of supported preamble indexes. In some aspects, the PLC 806 may configure the SAs 804a, 804b, 804c with the supported preamble indexes via RRC signalling (e.g., the configuration information 822 may indicate the supported preamble indexes for the PLC 806). In some other aspects, each of the SAs 804a, 804b, 804c may be configured to derive the supported preamble indexes based on an ID or address associated with the PLC 806, such as a PHY source ID of the PLC 806.

To find the $N_{PA,PLC}$ preambles that can be supported, the PLC 806 may be configured to, first, select a root ZC sequence (e.g., based on negotiation with neighboring UE(s)) and, next, uniformly occupy different CSs with the selected root ZC sequence. If the number within the root ZC sequence (including uniformly occupied CSs) is less than $N_{PA,PLC}$, then the PLC 806 may further uniformly occupy different CSs in a second root ZC sequence. Potentially, the CS between sequences $C_v$ may be included as a minimum, e.g., depending on the delay spread of the channel. Further, the PLC 806 may coordinate and/or negotiate with a base station(s) (e.g., gNB) and/or neighboring PLC(s) (e.g., neighboring UE) to determine supported preamble indexes for the PLC 806.

Illustratively, the first SA 804a may transmit the SR 826 as a preamble which may be based on a root ZC sequence that is indicated as supported by the PLC 806 in the configuration information 822. Potentially, the first SA 804a may apply at least one valid CS 850 to the sequence in order to transmit the preamble that conveys the SR 826. The at least one valid CS 850 may be configured for the first SA 804a by the configuration information 822.

In some aspects, the PLC 806 may configure each of the SAs 804a, 804b, 804c with a respective preamble index via RRC signalling (e.g., the configuration information 822 may indicate a respective preamble index), which may be similar to configuration of a UE with a preamble for a contention-free RACH procedure in a RAN. In some other aspects, each of the SAs 804a, 804b, 804c may be configured to derive a respective preamble index based on an ID or address associated with the PLC 806, such as a PHY source ID of the PLC 806, and/or an ID of the SA, such as a PHY destination ID. If $N_{PA,PLC} \geq$ the number of SAs 804a, 804b, 804c, then the PLC 806 may assign each of the SAs 804a, 804b, 804c a unique preamble index (or ID). Otherwise, if $N_{PA,PLC} <$ the number of SAs 804a, 804b, 804c, then the PLC 806 may either: (1) configure the SAs 804a, 804b, 804c into subgroups with a corresponding time resource so that each of the SAs 804a, 804b, 804c accesses the RACH-like SR resources 904 in a time-division multiplexing (TDM) manner; or (2) poll each of the SAs 804a, 804b, 804c configured with the same preamble index, e.g., when a preamble collision occurs and/or periodically.

In some aspects, the PLC 806 may configure a set of reserved preamble indexes, and the PLC 806 may dedicate each of the reserved preamble indexes to a respective one of the SAs 804a, 804b, 804c that is associated with a high-priority, low-latency, and ultra-reliability condition. For example, the PLC 806 may dedicate a reserved preamble index to the first SA 804a, which may be configured for URLLC communication. Accordingly, the first SA 804a may transmit the reserved preamble index to the PLC 806 in the SR resources 904 to convey an SR. The PLC 806 may then assign the remaining preamble indexes to those of the SAs 804a, 804b, 804c determined to be of a relatively lower-priority.

According to a second configuration of PSFCH SR transmission, the resources allocated to the PSFCH may be shared for both HARQ feedback and SRs. For example, one RB of the PSFCH may be used to transmit multiple bits of information, e.g., 1-bit HARQ feedback and 1-bit SR. In some aspects, HARQ ACK/NACK feedback and an SR may be carried on the same set of PSFCH resources according to the manner in which a PUCCH carries 1- or 2-bit HARQ ACK/NACK with simultaneous SR (e.g., as defined in 5G NR RAT). For example, different information bit(s) representing HARQ ACK/NACK are conveyed through a parameter a with different phase rotations separated by π and π/2 for 1- and 2-bit HARQ, respectively, with simultaneous SR conveyed by phase rotation increases of $$\frac{\pi}{4} \text{ and } \frac{\pi}{6}$$

for 1- and 2-bit HAKQ, respectively.

In some other aspects, HARQ feedback and SRs may be configured on the same PSFCH resources based on valid CS pairs, which may be applied to a sequence configured by the PLC 806. For example, the PSFCH may support {1, 2, 3, 6} CS pairs. The PSFCH CSs may be used to support multiplexing of multiple HARQ feedback, SRs, UEs, and/or a combination thereof, e.g., which may be facilitated by a PSFCH periodicity of one.

In order to separate carry both HARQ feedback and SRs, some slots in which the PSFCH is scheduled may be configured as HARQ occasions (e.g., so that HARQ feedback is carried thereon, and SRs are absent), whereas other slots in which the PSFCH is scheduled may be configured as SR occasions (e.g., so that SRs are carried thereon, and HARQ feedback is absent).

For example, for HARQ occasions, the PLC 806 may expect HARQ feedback for a number of transmitted TBs (e.g., the number of transmitted TBs conveying data and/or control information 824). HARQ feedback may be conveyed as one bit using valid CSs of either CS 0 for NACK-only HARQ feedback or two CSs, such as CS {0, 6} for both ACK/NACK HARQ feedback. However, two-bit HARQ feedback may be conveyed using valid CSs of either three CSs (e.g., CS {0, 3, 9}) or four CSs (e.g., CS {0, 3, 6, 9}). For example, two of the SAs 804a, 804b, 804c may transmit two-bit HARQ feedback on the same PSFCH resources by having one SA apply one of CS {0, 3, 9} and the other SA apply one of CS {2, 4, 10}. That is, SAs sharing the same RB(s) may be configured by the PLC 806 to select different CSs (e.g., based on $M_{ID}$ for calculating CS).

In another example, for SR occasions, some signalling may be configured to trigger SRs from each of the SAs 804a, 804b, 804c. For example, the PLC 806 may transmit a trigger for an SR in a MAC control element (CE) and/or polling. The first SA 804a may transmit the SR 826 using CS 0 (e.g., no CS). The second SA 804b may transmit an SR 840 on the same RB using a different CS 852. The multiplexing capacity for SAs on an SR occasion of the PSFCH may be based on the CS between sequences $C_v$, and per RB may be equal to the floor of the quotient of 12 divided by $C_v$.

Potentially, some slots in which the PSFCH is scheduled may be configured as both HARQ and SR occasions. In such occasions, SRs may be multiplexed with HARQ feedback on one set of PSFCH resources. For example, an SR may be multiplexed with HARQ feedback on PSFCH resources of one slot using a first set of CSs to indicate the SR and using a second set of CSs to indicate the HARQ feedback. The PLC 806 may be configured to differentiate SRs multiplexed with HARQ feedback based on the first and second sets of CSs with which the SR and HARQ feedback are respectively received.

For example, 1-bit HARQ feedback with simultaneous SR may be conveyed using a set of four valid CSs, such as CS {0, 3, 6, 9}. In another example, 2-bit HARQ feedback with simultaneous SR may be conveyed using eight CSs, such as CS {0, 1, 3, 4, 6, 7, 9, 10}. In some aspects, the HARQ feedback 828 and simultaneous SR 826 transmitted by the first SA 804a may be multiplexed with HARQ feedback and simultaneous SR 840 transmitted by the second SA 804b, e.g., using the same PSFCH resources and separated by different preambles (e.g., different sequence and valid CS combinations).

Potentially, a multi-bit SR may be supported through multiplexing. For example, the first SA 804a may transmit an SR 826 that includes multiple bits, which may indicate additional information, such as a buffer size upon which the PLC 806 may base the grant 830.

Based on the SR 826, the PLC 806 may generate a grant 830, which may indicate a set of resources on a sidelink channel allocated for transmission by the first SA 804a. The PLC 806 may transmit the grant 830 to the first SA 804a. The first SA 804a may receive the grant 830 and, based thereon, may transmit data 832 to the PLC 806. For example, the first SA 804a may transmit the data 832 on a set of resources allocated by the grant 830.

Figure 10:
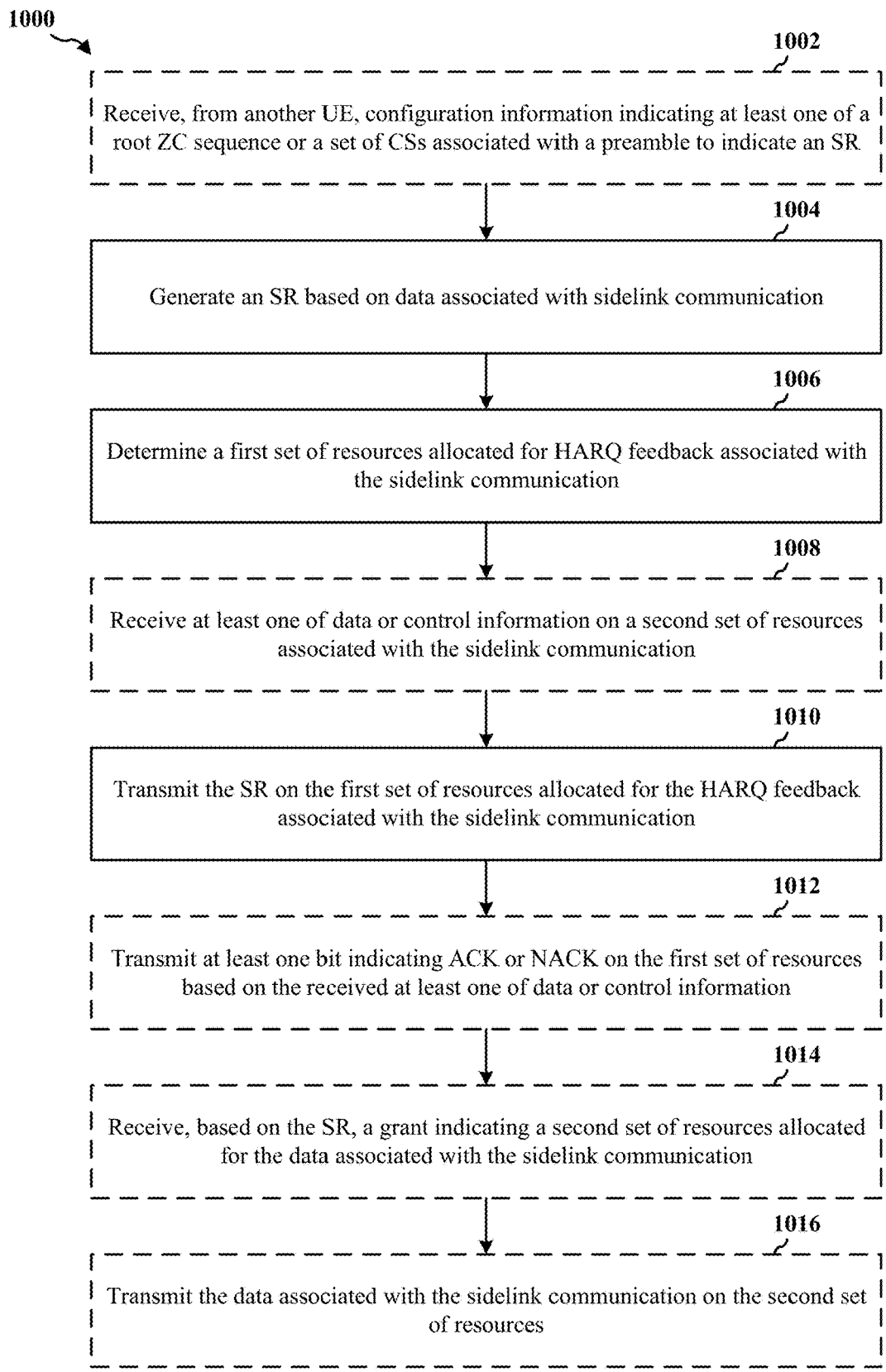
FIG. 10 is a flowchart of an example method of wireless communication.

FIG. 10 is a flowchart of a method 1000 of wireless communication. The method may be performed by a UE (e.g., the UE 104', 350, 504b, 506b), an SA (e.g., the SAs 604a, 604b, 604c, 804a, 804b, 804c), an apparatus (e.g., the apparatus 1202), and/or any component thereof. According to different aspects, one or more of the illustrated operations may be transposed, omitted, and/or contemporaneously performed.

At 1002, the UE may receive configuration information indicating at least one of a root ZC sequence or the at least one valid cyclic shift associated with a preamble to indicate an SR. In the context of FIG. 8, the first SA 804a may receive the configuration information 822, which may indicate at least one of a root ZC sequence and/or the at least one valid CS 850 associated with a preamble to indicate the SR 826.

At 1004, the UE may generate the SR based on data associated with sidelink communication. For example, the UE may determine a preamble based on a root ZC sequence, which may be indicated in the configuration information. Further, the UE may apply at least one valid CS for the preamble, and the SR may be conveyed as the preamble with the at least one valid CS. In the context of FIG. 8, the first SA 804a may generate the SR 826 based on the data 832 associated with sidelink communication.

At 1006, the UE may determine a first set of resources allocated for HARQ feedback associated with the sidelink communication. For example, the UE may select a communication or type of communication that the UE would like to transmit or receive, and the UE may access stored information that includes information indicating the resources onto which the UE should tune the appropriate circuitry for the selected communication or type of communication. In some aspects, the first set of resources allocated for the HARQ feedback associated with the sidelink communication includes a PSFCH, and the PSFCH includes two symbols of a slot in a time domain and a set of subchannels in the frequency domain. In some other aspects, the first set of resources is configured into a first subset of resources dedicated to the HARQ feedback associated with the sidelink communication and a second subset of resources dedicated to SRs, the first subset of resources being non-overlapping with the second set of resources. In the context of FIGS. 4 and 8, the first SA 804a may determine the resources allocated to the PSFCH 428 in at least one of the slots 402a-b. In the context of FIGS. 7 and 8, the first SA 804a may determine the resources allocated to the PSFCH 728 in the slot 702. In the context of FIGS. 8 and 9, the first SA 804a may determine the resources allocated to the PSFCH 928 in the slot 902.

At 1008, the UE may receive at least one of data and/or control information on a second set of resources associated with sidelink communication. In some aspects, the at least one of data or control information on the second set of resources includes control information on a PSCCH in a same slot as the first set of resources. In the context of FIG. 8, the first SA 804a may receive the information 824 from the PLC 806. In the context of FIGS. 4 and/or 7, the at least one of data and/or control information may be carried on the PSCCH 422, the PSSCH 424, the PSCCH 722, and/or the PSSCH 724.

At 1010, the UE may transmit the SR on the first set of resources allocated for the HARQ feedback associated with the sidelink communication. In the context of FIG. 8, the first SA 804a may transmit, to the PLC 806, the SR 826 on the first set of resources allocated for the HARQ feedback 828 associated with the sidelink communication. In the context of FIG. 4, the SR may be transmitted on the resources of the PSFCH 428 in one of the slots 402a-b. In the context of FIG. 9, the SR may be transmitted on the PSFCH 928 in the SR resources 904 of the slot 902.

At 1012, the UE may transmit at least one bit indicating ACK or NACK on the first set of resources based on the received at least one of data and/or control information. In some aspects, the SR may be multiplexed on the first set of resources with the HARQ feedback, which may be the at least one bit indicating ACK or NACK. For example, the SR may be multiplexed on the first set of resources with the HARQ feedback using a first set of cyclic shifts to indicate the SR and a second set of cyclic shifts to indicate the HARQ feedback. In the context of FIG. 8, the first SA 804a may transmit the HARQ feedback 828 to the PLC 806 based on the received information 824. In the context of FIG. 4, the HARQ feedback may be transmitted on the resources of the PSFCH 428 of one of the slots 402a-b. In the context of FIG. 7, the HARQ feedback may be transmitted on the resources of the PSFCH 728 of the slot 702. In the context of FIG. 9, the HARQ feedback may be transmitted on the PSFCH 928 in the HARQ resources 906 of the slot 902.

At 1014, the UE may receive, based on the SR, a grant indicating a second set of resources allocated for the data associated with sidelink communication. In the context of FIG. 8, the first SA 804a may receive, from the PLC 806 based on the SR 826, the grant 830 indicating a second set of resources allocated for the data 832.

At 1016, the UE may transmit the data associated with the sidelink communication on the second set of resources. In the context of FIG. 8, the first SA 804a may transmit, to the PLC 806 based on the grant 830, the data 832 on the second set of resources indicated by the grant 830.

Figure 11:
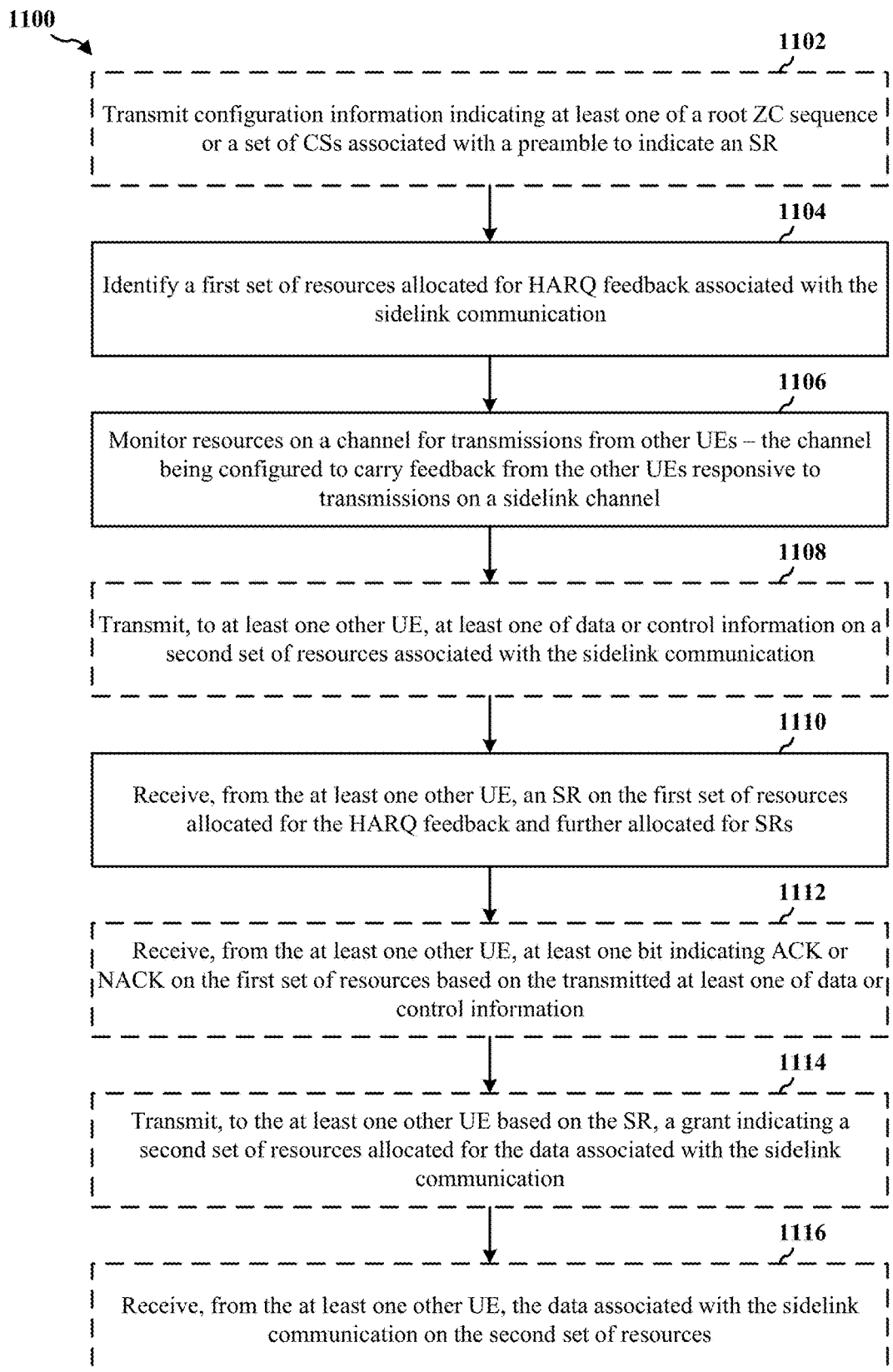
FIG. 11 is a flowchart of another example method of wireless communication.

FIG. 11 is a flowchart of a method 1100 of wireless communication. The method may be performed by a UE (e.g., the UE 104, 350, 504a, 506a; the PLC 606, 806). According to different aspects, one or more of the illustrated operations may be transposed, omitted, and/or contemporaneously performed.

At 1102, the UE may transmit configuration information indicating at least one of a root ZC sequence or the at least one valid cyclic shift associated with a preamble to indicate an SR. In the context of FIG. 8, the PLC 806 may transmit, to the SAs 804a, 804b, 804c, the configuration information 822, which may indicate at least one of a root ZC sequence and/or the at least one valid CS 850 associated with a preamble to indicate the SR 826.

At 1104, the UE may identify a first set of resources allocated for HARQ feedback associated with the sidelink communication. For example, the UE may generate feedback in response to a transmission, or the UE may determine that a feedback is expected in response to a transmission, and the UE may access stored information that includes information indicating the resources onto which the UE should tune the appropriate circuitry for transmitting or receiving the feedback. In some aspects, the first set of resources allocated for the HARQ feedback associated with the sidelink communication includes a PSFCH, and the PSFCH includes two symbols of a slot in a time domain and a set of subchannels in the frequency domain. In some other aspects, the first set of resources is configured into a first subset of resources dedicated to the HARQ feedback associated with the sidelink communication and a second subset of resources dedicated to SRs, the first subset of resources being non-overlapping with the second set of resources. In the context of FIGS. 4 and 8, the PLC 806 may determine the resources allocated to the PSFCH 428 in at least one of the slots 402a-b. In the context of FIGS. 7 and 8, the PLC 806 may determine the resources allocated to the PSFCH 728 in the slot 702. In the context of FIGS. 8 and 9, the PLC 806 may determine the resources allocated to the PSFCH 928 in the slot 902.

At 1106, the UE may monitor resources on a channel for transmissions from other UEs—the channel being configured to carry feedback from the other UEs responsive to transmissions on a sidelink channel. For example, the UE may determine a schedule or interval according to which the UE is to detect for signals from other UEs on certain resources of a sidelink channel (e.g., PSSCH, PSCCH, etc.). The UE may tune receiver circuitry, such as an antenna, receive chain, etc., onto the sidelink channel, and the UE may find and attempt to decode some signals that the UE detects while monitoring the resources. In some aspects, the first set of resources is configured into a first subset of resources dedicated to the HARQ feedback associated with the sidelink communication and a second subset of resources dedicated to SRs, the first subset of resources being non-overlapping with the second set of resources. In the context of FIGS. 4 and 8, the PLC 806 may determine the resources allocated to the PSFCH 428 in at least one of the slots 402a-b are further allocated for SRs from the SAs 804a, 804b, 804c. In the context of FIGS. 7 and 8, the PLC 806 may determine the resources allocated to the PSFCH 728 in the slot 702 are further allocated for SRs from the SAs 804a, 804b, 804c. In the context of FIGS. 8 and 9, the first SA 804a may determine the resources allocated to the PSFCH 928 in the slot 902 are configured into a subset of SR resources 904 and a subset of HARQ resources 906.

At 1108, the UE may transmit, to at least one other UE, at least one of data and/or control information on a second set of resources associated with sidelink communication. In some aspects, the at least one of data or control information on the second set of resources includes control information on a PSCCH in a same slot as the first set of resources. In the context of FIG. 8, the PLC 806 may transmit the information 824 to the first SA 804a. In the context of FIGS.

4 and/or 7, the at least one of data and/or control information may be carried on the PSCCH 422, the PSSCH 424, the PSCCH 722, and/or the PSSCH 724.

At 1110, the UE may receive, from the at least one other UE, an SR on the first set of resources allocated for the HARQ feedback associated with the sidelink communication. In the context of FIG. 8, the PLC 806 may receive, from the first SA 804*a*, the SR 826 on the first set of resources allocated for the HARQ feedback 828 associated with the sidelink communication. In the context of FIG. 4, the SR may be received on the resources of the PSFCH 428 in one of the slots 402*a-b*. In the context of FIG. 9, the SR may be received on the PSFCH 928 in the SR resources 904 of the slot 902.

At 1112, the UE may receive, from the at least one other UE, at least one bit indicating ACK or NACK on the first set of resources based on the transmitted at least one of data and/or control information. In some aspects, the SR may be multiplexed on the first set of resources with the HARQ feedback, which may be the at least one bit indicating ACK or NACK. For example, the SR may be multiplexed on the first set of resources with the HARQ feedback using a first set of cyclic shifts to indicate the SR and a second set of cyclic shifts to indicate the HARQ feedback. In the context of FIG. 8, the PLC 806 may receive the HARQ feedback 828 from the first SA 804*a* based on the transmitted information 824. In the context of FIG. 4, the HARQ feedback may be received on the resources of the PSFCH 428 of one of the slots 402*a-b*. In the context of FIG. 7, the HARQ feedback may be received on the resources of the PSFCH 728 of the slot 702. In the context of FIG. 9, the HARQ feedback may be received on the PSFCH 928 in the HARQ resources 906 of the slot 902.

At 1114, the UE may transmit, to the at least one other UE based on the SR, a grant indicating a second set of resources allocated for the data associated with sidelink communication. In the context of FIG. 8, the PLC 806 may transmit, to the first SA 804*a* based on the SR 826, the grant 830 indicating a second set of resources allocated for the data 832.

At 1116, the UE may receive, from the at least one other UE, the data associated with the sidelink communication on the second set of resources. In the context of FIG. 8, the PLC 806 may receive, from the first SA 804*a* based on the grant 830, the data 832 on the second set of resources indicated by the grant 830.

Figure 12:
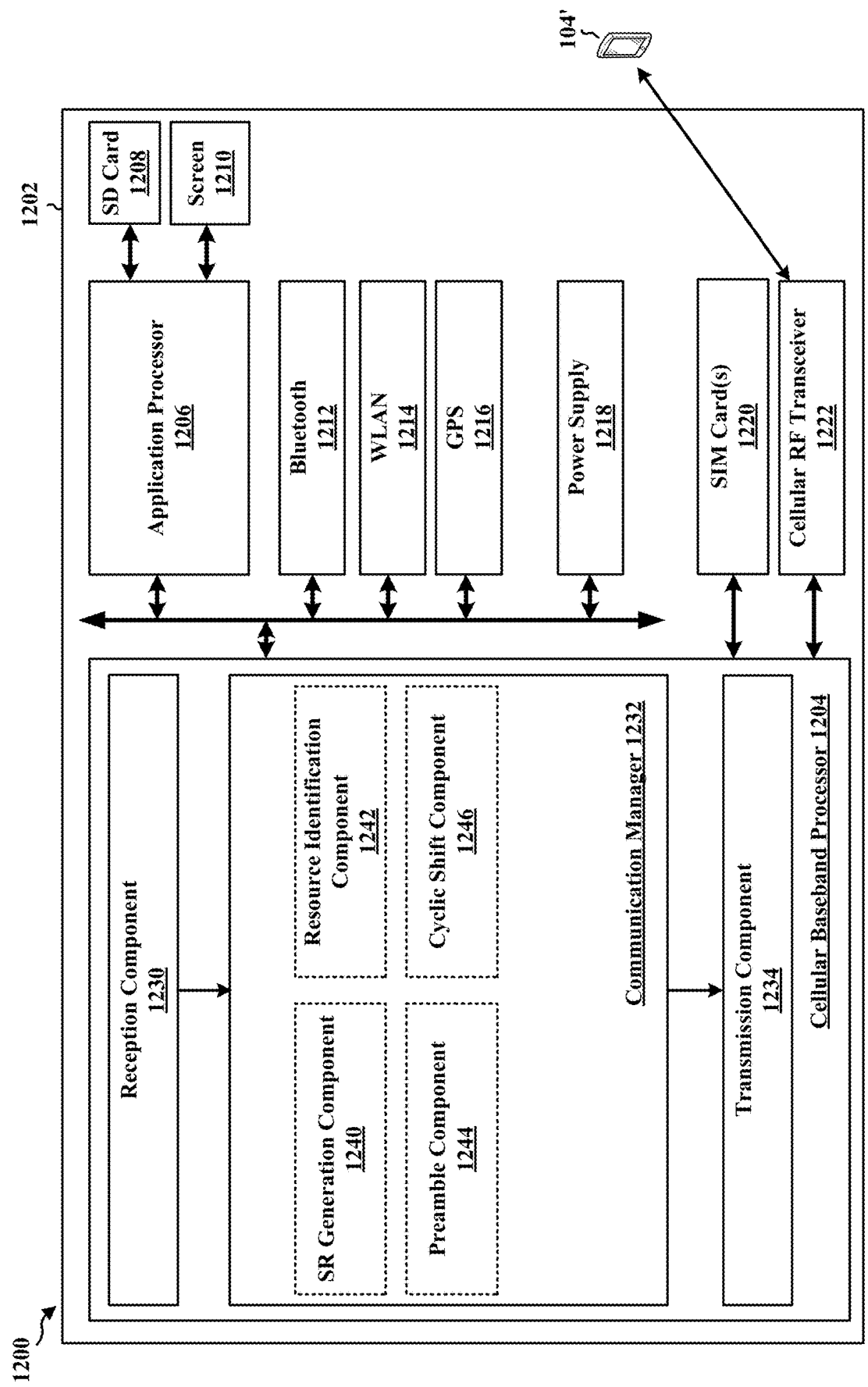
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE or similar device, or the apparatus 1202 may be a component of a UE or similar device. The apparatus 1202 may include a cellular baseband processor 1204 (also referred to as a modem) and/or a cellular RF transceiver 1222, which may be coupled together and/or integrated into the same package or module.

In some aspects, the apparatus 1202 may accept or may include one or more subscriber identity modules (SIM) cards 1220, which may include one or more integrated circuits, chips, or similar circuitry, and which may be removable or embedded. The one or more SIM cards 1220 may carry identification and/or authentication information, such as an international mobile subscriber identity (IMSI) and/or IMSI-related key(s). Further, the apparatus 1202 may include one or more of an application processor 1206 coupled to a secure digital (SD) card 1208 and a screen 1210, a Bluetooth module 1212, a wireless local area network (WLAN) module 1214, a Global Positioning System (GPS) module 1216, and/or a power supply 1218.

The cellular baseband processor 1204 communicates through the cellular RF transceiver 1222 with the UE 104 and/or base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204.

In the context of FIG. 3, the cellular baseband processor 1204 may be a component of the UE 350 and may include the memory 360 and/or at least one of the TX processor 368, the RX processor 356, and/or the controller/processor 359. In one configuration, the apparatus 1202 may be a modem chip and/or may be implemented as the baseband processor 1204, while in another configuration, the apparatus 1202 may be the entire UE (e.g., the UE 350 of FIG. 3) and may include some or all of the abovementioned modules, components, and/or circuitry illustrated in the context of the apparatus 1202. In one configuration, the cellular RF transceiver 1222 may be implemented as at least one of the transmitter 354TX and/or the receiver 354RX.

The reception component 1230 may be configured to receive signaling on a wireless channel, such as signaling from a base station or UE 104. The transmission component 1234 may be configured to transmit signaling on a wireless channel, such as signaling to a base station 102/180 or UE 104. The communication manager 1232 may coordinate or manage some or all wireless communications by the apparatus 1202, including across the reception component 1230 and the transmission component 1234.

The reception component 1230 may provide some or all data and/or control information included in received signaling to the communication manager 1232, and the communication manager 1232 may generate and provide some or all of the data and/or control information to be included in transmitted signaling to the transmission component 1234. The communication manager 1232 may include the various illustrated components, including one or more components configured to process received data and/or control information, and/or one or more components configured to generate data and/or control information for transmission.

The communication manager 1232 may include, inter alia, an SR generation component 1240, a resource identification component 1242, a preamble component 1244, and a cyclic shift component 1246.

The reception component 1230 may be configured to receive configuration information indicating at least one of a root ZC sequence or the at least one valid cyclic shift associated with a preamble to indicate an SR, e.g., as described in connection with 1002 of FIG. 10.

The SR generation component 1240 may be configured to generate the SR based on data associated with sidelink communication, e.g., as described in connection with 1004 of FIG. 10. For example, the SR generation component 1240 may determine a preamble based on a root ZC sequence, which may be indicated in the configuration information. Further, the SR generation component 1240 may identify the root ZC sequence assigned to the apparatus 1202, and the SR generation component 1240 may apply at least one valid CS for the preamble, and the SR may be conveyed as the preamble with the at least one valid CS.

The resource identification component 1242 may be configured to determine a first set of resources allocated for HARQ feedback associated with the sidelink communication, e.g., as described in connection with 1006 of FIG. 10. For example, the resource identification component 1242 may select a communication or type of communication that the apparatus 1202 would like to transmit or receive, and the resource identification component 1242 may access stored information that includes information indicating the resources onto which the apparatus 1202 should tune the appropriate circuitry for the selected communication or type of communication. In some aspects, the first set of resources allocated for the HARQ feedback associated with the sidelink communication includes a PSFCH, and the PSFCH includes two symbols of a slot in a time domain and a set of subchannels in the frequency domain. In some other aspects, the first set of resources is configured into a first subset of resources dedicated to the HARQ feedback associated with the sidelink communication and a second subset of resources dedicated to SRs, the first subset of resources being non-overlapping with the second set of resources.

The reception component 1230 may receive at least one of data and/or control information on a second set of resources associated with sidelink communication, e.g., as described in connection with 1008 of FIG. 10. In some aspects, the at least one of data or control information on the second set of resources includes control information on a PSCCH in a same slot as the first set of resources.

The transmission component 1234 may be configured to transmit the SR on the first set of resources allocated for the HARQ feedback associated with the sidelink communication, e.g., as described in connection with 1010 of FIG. 10.

The transmission component 1234 may be further configured to transmit at least one bit indicating ACK or NACK on the first set of resources based on the received at least one of data and/or control information, e.g., as described in connection with 1012 of FIG. 10. In some aspects, the SR may be multiplexed on the first set of resources with the HARQ feedback, which may be the at least one bit indicating ACK or NACK. For example, the SR may be multiplexed on the first set of resources with the HARQ feedback using a first set of cyclic shifts to indicate the SR and a second set of cyclic shifts to indicate the HARQ feedback.

The reception component 1230 may be further configured to receive, based on the SR, a grant indicating a second set of resources allocated for the data associated with sidelink communication, e.g., as described in connection with 1014 of FIG. 10.

The transmission component 1234 may be further configured to transmit the data associated with the sidelink communication on the second set of resources, e.g., as described in connection with 1016 of FIG. 10.

The apparatus 1202 may include additional components that perform some or all of the blocks, operations, signaling, etc. of the algorithm(s) in the aforementioned call flow diagram(s) and/or flowchart(s) of FIGS. 8 and/or 10. As such, some or all of the blocks, operations, signaling, etc. in the aforementioned call flow diagram(s) and/or flowchart(s) of FIGS. 8 and/or 10 may be performed by a component and the apparatus 1202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for generating a scheduling request to request to transmit at least one of data or control information on a sidelink channel; and means for transmitting, to another UE 104, the scheduling request on resources of a channel configured to carry feedback responsive to transmissions on the sidelink channel.

In one configuration, the apparatus 1202, and in particular the cellular baseband processor 1204, may further include means for receiving, from the other UE 104 based on the scheduling request, at least one grant indicating resources allocated on the sidelink channel; and means for transmitting, to the other UE 104 based on the grant, at least one of data or control information on the resources allocated on the sidelink channel.

In one configuration, the apparatus 1202, and in particular the cellular baseband processor 1204, may further include means for receiving, from the other UE 104, at least one of data or control information on resources of the sidelink channel; and means for transmitting, to the other UE 104 on the channel configured to carry feedback, feedback responsive to the at least one of the data or control information transmitted on the resources of the sidelink channel, the feedback including either an ACK or a NACK corresponding to the at least one of the data or control information.

In one configuration, the channel configured to carry feedback includes a PSCCH, and the resources of the sidelink channel on which the at least one of the data or control information is transmitted and the resources of the channel configured to carry feedback on which the scheduling request is received including a same slot.

In one configuration, the channel configured to carry feedback includes a PSFCH, and the resources of the channel configured to carry feedback on which the scheduling request is received include two symbols of a slot in a time domain and a set of subchannels in the frequency domain.

In one configuration, the channel is configured with a first set of resources dedicated to scheduling requests and a second set of resources dedicated to feedback, and the first set of resources does not overlap with the second set of resources.

In one configuration, the means for generating the scheduling request is configured to determine a preamble based on a root Zadoff-Chu sequence, and the scheduling request includes the preamble, and the preamble is transmitted on the second set of resources.

In one configuration, the apparatus 1202, and in particular the cellular baseband processor 1204, may further include means for applying at least one valid cyclic shift to the preamble, and the scheduling request includes the preamble with the at least one valid cyclic shift.

In one configuration, the apparatus 1202, and in particular the cellular baseband processor 1204, may further include means for receiving configuration information associated with the preamble, the configuration information indicating at least one of the root Zadoff-Chu sequence or the at least one valid cyclic shift.

In one configuration, the scheduling request is multiplexed with feedback on the resources of the channel configured to carry the feedback.

In one configuration, on the resources of the channel configured to carry the feedback, the scheduling request includes a first set of cyclic shifts and the feedback includes a second set of cyclic shifts different from the first set of cyclic shifts.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
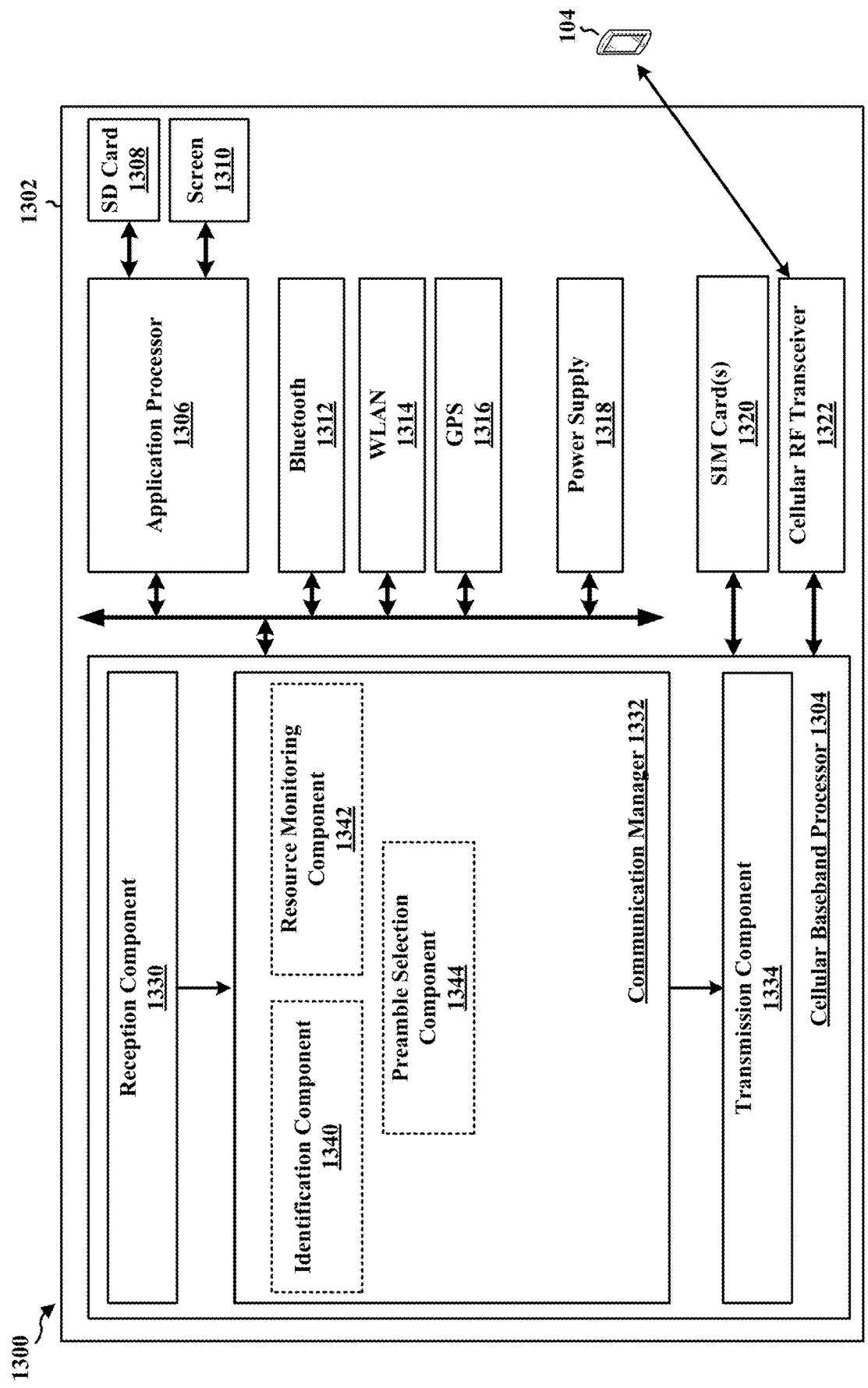
FIG. 13 is a diagram illustrating another example of a hardware implementation for another example apparatus.

FIG. 13 is a diagram 1300 illustrating an example of a hardware implementation for an apparatus 1302. The apparatus 1302 may be a UE or similar device, or the apparatus 1302 may be a component of a UE or similar device. The apparatus 1302 may include a cellular baseband processor 1304 (also referred to as a modem) and/or a cellular RF transceiver 1322, which may be coupled together and/or integrated into the same package or module.

In some aspects, the apparatus 1302 may accept or may include one or more SIM cards 1320, which may include one or more integrated circuits, chips, or similar circuitry, and which may be removable or embedded. The one or more SIM cards 1320 may carry identification and/or authentication information, such as an IMSI and/or IMSI-related key(s). Further, the apparatus 1302 may include one or more of an application processor 1306 coupled to a SD card 1308 and a screen 1310, a Bluetooth module 1312, a WLAN module 1314, a GPS module 1316, and/or a power supply 1318.

The cellular baseband processor 1304 communicates through the cellular RF transceiver 1322 with the UE 104' and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304.

In the context of FIG. 3, the cellular baseband processor 1304 may be a component of the UE 350 and may include the memory 360 and/or at least one of the TX processor 368, the RX processor 356, and/or the controller/processor 359. In one configuration, the apparatus 1302 may be a modem chip and/or may be implemented as the baseband processor 1304, while in another configuration, the apparatus 1302 may be the entire UE (e.g., the UE 350 of FIG. 3) and may include some or all of the abovementioned modules, components, and/or circuitry illustrated in the context of the apparatus 1302. In one configuration, the cellular RF transceiver 1322 may be implemented as at least one of the transmitter 354TX and/or the receiver 354RX.

The reception component 1330 may be configured to receive signaling on a wireless channel, such as signaling from a base station or UE 104'. The transmission component 1334 may be configured to transmit signaling on a wireless channel, such as signaling to a base station and/or UE 104'. The communication manager 1332 may coordinate or manage some or all wireless communications by the apparatus 1302, including across the reception component 1330 and the transmission component 1334.

The reception component 1330 may provide some or all data and/or control information included in received signaling to the communication manager 1332, and the communication manager 1332 may generate and provide some or all of the data and/or control information to be included in transmitted signaling to the transmission component 1334. The communication manager 1332 may include the various illustrated components, including one or more components configured to process received data and/or control information, and/or one or more components configured to generate data and/or control information for transmission.

The communication manager 1332 may include, inter alia, include an identification component 1340, a resource monitoring component 1342, and a preamble component 1344.

The transmission component 1334 may transmit configuration information indicating at least one of a root ZC sequence or the at least one valid cyclic shift associated with a preamble to indicate an SR, e.g., as described in connection with 1102 of FIG. 11.

The identification component 1340 may be configured to identify a first set of resources allocated for HARQ feedback associated with the sidelink communication, e.g., as described in connection with 1104 of FIG. 11. For example, the identification component 1340 may generate feedback in response to a transmission, or the identification component 1340 may determine that a feedback is expected in response to a transmission, and the identification component 1340 may access stored information that includes information indicating the resources onto which the apparatus 1302 should tune the appropriate circuitry for transmitting or receiving the feedback. In some aspects, the first set of resources allocated for the HARQ feedback associated with the sidelink communication includes a PSFCH, and the PSFCH includes two symbols of a slot in a time domain and a set of subchannels in the frequency domain. In some other aspects, the first set of resources is configured into a first subset of resources dedicated to the HARQ feedback associated with the sidelink communication and a second subset of resources dedicated to SRs, the first subset of resources being non-overlapping with the second set of resources.

The resource monitoring component 1342 may monitor resources on a channel for transmissions from other UEs—the channel being configured to carry feedback from the other UEs responsive to transmissions on a sidelink channel, e.g., as described in connection with 1106 of FIG. 11. For example, the resource monitoring component 1342 may determine a schedule or interval according to which the resource monitoring component 1342 is to detect for signals from other UEs on certain resources of a sidelink channel (e.g., PSSCH, PSCCH, etc.). The resource monitoring component 1342 may tune receiver circuitry, such as an antenna, receive chain, etc., onto the sidelink channel, and the resource monitoring component 1342 may find and attempt to decode some signals that the resource monitoring component 1342 detects while monitoring the resources. In some aspects, the first set of resources is configured into a first subset of resources dedicated to the HARQ feedback associated with the sidelink communication and a second subset of resources dedicated to SRs, the first subset of resources being non-overlapping with the second set of resources.

The transmission component 1334 may be further configured to transmit, to at least one other UE 104', at least one of data and/or control information on a second set of resources associated with sidelink communication, e.g., as described in connection with 1108 of FIG. 11. In some aspects, the at least one of data or control information on the second set of resources includes control information on a PSCCH in a same slot as the first set of resources.

The reception component 1330 may be configured to receive, from the at least one other UE 104', an SR on the first set of resources allocated for the HARQ feedback associated with the sidelink communication, e.g., as described in connection with 1110 of FIG. 11.

The reception component 1330 may be further configured to receive, from the at least one other UE, at least one bit indicating ACK or NACK on the first set of resources based on the transmitted at least one of data and/or control information, e.g., as described in connection with 1112 of FIG. 11. In some aspects, the SR may be multiplexed on the first set of resources with the HARQ feedback, which may be the at least one bit indicating ACK or NACK. For example, the SR may be multiplexed on the first set of resources with the HARQ feedback using a first set of cyclic shifts to indicate the SR and a second set of cyclic shifts to indicate the HARQ feedback.

The transmission component 1334 may be further configured to transmit, to the at least one other UE 104' based on the SR, a grant indicating a second set of resources allocated for the data associated with sidelink communication, e.g., as described in connection with 1114 of FIG. 11.

The reception component 1330 may be further configured to receive, from the at least one other UE 104', the data associated with the sidelink communication on the second set of resources, e.g., as described in connection with 1116 of FIG. 11.

The apparatus 1302 may include additional components that perform some or all of the blocks, operations, signaling, etc. of the algorithm(s) in the aforementioned call flow diagram(s) and/or flowchart(s) of FIGS. 8 and/or 11. As such, some or all of the blocks, operations, signaling, etc. in the aforementioned call flow diagram(s) and/or flowchart(s) of FIGS. 8 and/or 11 may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for monitoring resources on a channel for transmissions from other UE 104', the channel being configured to carry feedback from the other UE 104' responsive to transmissions on a sidelink channel; and means for receiving at least one scheduling request from at least one of the other UE 104' on the resources of the channel configured to carry the feedback based on monitoring the resources on the channel.

In one configuration, the apparatus 1302, and in particular the cellular baseband processor 1304, may further include means for transmitting, to the at least one of the other UE 104' based on the at least one scheduling request, at least one grant indicating resources allocated on the sidelink channel; and means for receiving, from the at least one of the other UE 104' based on the grant, at least one of data or control information on the resources allocated on the sidelink channel.

In one configuration, the apparatus 1302, and in particular the cellular baseband processor 1304, may further include means for transmitting, to the at least one of the other UE 104', at least one of data or control information on resources of the sidelink channel; and means for receiving, from the at least one of the other UE 104' on the channel configured to carry feedback, feedback responsive to the at least one of the data or control information transmitted on the resources of the sidelink channel, the feedback including either an ACK or a NACK corresponding to the at least one of the data or control information.

In one configuration, the channel configured to carry feedback includes a PSCCH, the resources of the sidelink channel on which the at least one of the data or control information is transmitted and the resources of the channel configured to carry feedback on which the scheduling request is received including a same slot.

In one configuration, the channel configured to carry feedback includes a PSFCH, and the resources of the channel configured to carry feedback on which the scheduling request is received include two symbols of a slot in a time domain and a set of subchannels in the frequency domain.

In one configuration, the channel is configured with a first set of resources dedicated to scheduling requests and a second set of resources dedicated to feedback, and the first set of resources does not overlap with the second set of resources.

In one configuration, the apparatus 1302, and in particular the cellular baseband processor 1304, may further include means for determining a supported set of preambles based on a root Zadoff-Chu sequence, and the at least one scheduling request includes at least one preamble included in the supported set of preambles, and the preamble is received on the first set of resources.

In one configuration, the at least one scheduling request includes the at least one preamble with at least one valid cyclic shift.

In one configuration, the apparatus 1302, and in particular the cellular baseband processor 1304, may further include means for transmitting configuration information associated with the supported set of preambles, the configuration information indicating at least one of the root Zadoff-Chu sequence or the at least one valid cyclic shift.

In one configuration, the scheduling request is multiplexed with feedback on the resources of the channel configured to carry the feedback.

In one configuration, on the resources of the channel configured to carry the feedback, the scheduling request includes a first set of cyclic shifts and the feedback includes a second set of cyclic shifts different from the first set of cyclic shifts.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The specific order or hierarchy of blocks or operations in each of the foregoing processes, flowcharts, and other diagrams disclosed herein is an illustration of example approaches. Based upon design preferences, one of ordinary skill will readily recognize that the specific order or hierarchy of blocks each the processes, flowcharts, and other diagrams may be rearranged, omitted, and/or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

In some aspects, example 1 is a method of wireless communication at a UE, including: generating a scheduling request to request to transmit at least one of data or control information on a sidelink channel; and transmitting, to another UE, the scheduling request on resources of a channel configured to carry feedback responsive to transmissions on the sidelink channel.

Example 2 may include the method of example 1, further including: receiving, from the other UE based on the scheduling request, at least one grant indicating resources allocated on the sidelink channel; and transmitting, to the other UE based on the grant, at least one of data or control information on the resources allocated on the sidelink channel.

Example 3 may include the method of example 1, further including: receiving, from the other UE, at least one of data or control information on resources of the sidelink channel; and transmitting, to the other UE on the channel configured to carry feedback, feedback responsive to the at least one of the data or control information transmitted on the resources of the sidelink channel, the feedback including either an ACK or a NACK corresponding to the at least one of the data or control information.

Example 4 may include the method of example 3, and the channel configured to carry feedback includes a PSCCH, and the resources of the sidelink channel on which the at least one of the data or control information is transmitted and the resources of the channel configured to carry feedback on which the scheduling request is received including a same slot.

Example 5 may include the method of example 1, and the channel configured to carry feedback includes a PSFCH, and the resources of the channel configured to carry feedback on which the scheduling request is received include two symbols of a slot in a time domain and a set of subchannels in the frequency domain.

Example 6 may include the method of example 1, and the channel is configured with a first set of resources dedicated to scheduling requests and a second set of resources dedicated to feedback, and the first set of resources does not overlap with the second set of resources.

Example 7 may include the method of example 6, and the generating the scheduling request includes: determining a preamble based on a root Zadoff-Chu sequence, and the scheduling request includes the preamble, and the preamble is transmitted on the second set of resources.

Example 8 may include the method of example 7, further including: applying at least one valid cyclic shift to the preamble, and the scheduling request includes the preamble with the at least one valid cyclic shift.

Example 9 may include the method of example 8, further including: receiving configuration information associated with the preamble, the configuration information indicating at least one of the root Zadoff-Chu sequence or the at least one valid cyclic shift.

Example 10 may include the method of example 1, and the scheduling request is multiplexed with feedback on the resources of the channel configured to carry the feedback.

Example 11 may include the method of example 10, and on the resources of the channel configured to carry the feedback, the scheduling request includes a first set of cyclic shifts and the feedback includes a second set of cyclic shifts different from the first set of cyclic shifts.

In some other aspects, example 12 may be another method of wireless communication at a UE, including: monitoring resources on a channel for transmissions from other UE, the channel being configured to carry feedback from the other UE responsive to transmissions on a sidelink channel; and receiving at least one scheduling request from at least one of the other UE on the resources of the channel configured to carry the feedback based on monitoring the resources on the channel.

Example 13 may include the method of example 12, further including: transmitting, to the at least one of the other UE based on the at least one scheduling request, at least one grant indicating resources allocated on the sidelink channel; and receiving, from the at least one of the other UE based on the grant, at least one of data or control information on the resources allocated on the sidelink channel.

Example 14 may include the method of example 12, further including: transmitting, to the at least one of the other UE, at least one of data or control information on resources of the sidelink channel; and receiving, from the at least one of the other UE on the channel configured to carry feedback, feedback responsive to the at least one of the data or control information transmitted on the resources of the sidelink channel, the feedback including either an ACK or a NACK corresponding to the at least one of the data or control information.

Example 15 may include the method of example 14, and the channel configured to carry feedback includes a PSCCH, the resources of the sidelink channel on which the at least one of the data or control information is transmitted and the resources of the channel configured to carry feedback on which the scheduling request is received including a same slot.

Example 16 may include the method of example 12, and the channel configured to carry feedback includes a physical sidelink feedback channel (PSFCH), and the resources of the channel configured to carry feedback on which the scheduling request is received include two symbols of a slot in a time domain and a set of subchannels in the frequency domain.

Example 17 may include the method of example 12, and the channel is configured with a first set of resources dedicated to scheduling requests and a second set of resources dedicated to feedback, and the first set of resources does not overlap with the second set of resources.

Example 18 may include the method of example 17, further including: determining a supported set of preambles based on a root Zadoff-Chu sequence, and the at least one scheduling request includes at least one preamble included in the supported set of preambles, and the preamble is received on the first set of resources.

Example 19 may include the method of example 18, and the at least one scheduling request includes the at least one preamble with at least one valid cyclic shift.

Example 20 may include the method of example 19, further including: transmitting configuration information associated with the supported set of preambles, the configuration information indicating at least one of the root Zadoff-Chu sequence or the at least one valid cyclic shift.

Example 21 may include the method of example 12, and the scheduling request is multiplexed with feedback on the resources of the channel configured to carry the feedback.

Example 22 may include the method of example 21, and on the resources of the channel configured to carry the feedback, the scheduling request includes a first set of cyclic shifts and the feedback includes a second set of cyclic shifts different from the first set of cyclic shifts.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include some communication and/or memory operations/procedures through which some information or value(s) are acquired, such as "receiving" (e.g., receiving information), "accessing" (e.g., accessing data in a memory), "detecting," and the like.

As another example, reference to an element in the singular is not intended to mean "one and only one" unless specifically so stated, but rather "one or more." In particular, reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   generating a scheduling request to request to transmit at least one of data or control information on a sidelink channel, wherein the generating the scheduling request comprises determining a preamble based on a root Zadoff-Chu sequence, wherein the scheduling request comprises the preamble, and the preamble is transmitted on a second set of resources dedicated to feedback; and
   transmitting, to another UE, the scheduling request on resources of a channel configured to carry feedback responsive to transmissions on the sidelink channel, wherein the channel is configured with a first set of resources dedicated to scheduling requests and the second set of resources dedicated to feedback, and the first set of resources does not overlap with the second set of resources.

2. The method of claim 1, further comprising:
   receiving, from the other UE based on the scheduling request, at least one grant indicating resources allocated on the sidelink channel; and
   transmitting, to the other UE based on the grant, at least one of data or control information on the resources allocated on the sidelink channel.

3. The method of claim 1, further comprising:
   receiving, from the other UE, at least one of data or control information on resources of the sidelink channel; and
   transmitting, to the other UE on the channel configured to carry feedback, feedback responsive to the at least one of the data or control information transmitted on the resources of the sidelink channel, the feedback comprising either an acknowledgement (ACK) or a non-ACK (NACK) corresponding to the at least one of the data or control information.

4. The method of claim 3, wherein the channel configured to carry feedback comprises a physical sidelink control channel (PSCCH), and the resources of the sidelink channel on which the at least one of the data or control information is transmitted and the resources of the channel configured to carry feedback on which the scheduling request is received comprising a same slot.

5. The method of claim 1, wherein the channel configured to carry feedback comprises a physical sidelink feedback channel (PSFCH), and the resources of the channel configured to carry feedback on which the scheduling request is received comprise two symbols of a slot in a time domain and a set of sub channels in a frequency domain.

6. The method of claim 1, further comprising:
   applying at least one valid cyclic shift to the preamble, wherein the scheduling request comprises the preamble with the at least one valid cyclic shift.

7. The method of claim 6, further comprising:
receiving configuration information associated with the preamble, the configuration information indicating at least one of the root Zadoff-Chu sequence or the at least one valid cyclic shift.

8. The method of claim 1, wherein the scheduling request is multiplexed with feedback on the resources of the channel configured to carry the feedback.

9. The method of claim 8, wherein on the resources of the channel configured to carry the feedback, the scheduling request comprises a first set of cyclic shifts and the feedback comprises a second set of cyclic shifts different from the first set of cyclic shifts.

10. A method of wireless communication at a user equipment (UE), comprising:
determining a supported set of preambles based on a root Zadoff-Chu sequence;
monitoring resources on a channel for transmissions from other UE, the channel being configured to carry feedback from the other UE responsive to transmissions on a sidelink channel; and
receiving at least one scheduling request from at least one of the other UE on the resources of the channel configured to carry the feedback based on monitoring the resources on the channel, wherein the channel is configured with a first set of resources dedicated to scheduling requests and a second set of resources dedicated to feedback, and the first set of resources does not overlap with the second set of resources, wherein the at least one scheduling request comprises at least one preamble included in the supported set of preambles, and the preamble is received on the first set of resources.

11. The method of claim 10, further comprising:
transmitting, to the at least one of the other UE based on the at least one scheduling request, at least one grant indicating resources allocated on the sidelink channel; and
receiving, from the at least one of the other UE based on the grant, at least one of data or control information on the resources allocated on the sidelink channel.

12. The method of claim 10, further comprising:
transmitting, to the at least one of the other UE, at least one of data or control information on resources of the sidelink channel; and
receiving, from the at least one of the other UE on the channel configured to carry feedback, feedback responsive to the at least one of the data or control information transmitted on the resources of the sidelink channel, the feedback comprising either an acknowledgement (ACK) or a non-ACK (NACK) corresponding to the at least one of the data or control information.

13. The method of claim 12, wherein the channel configured to carry feedback comprises a physical sidelink control channel (PSCCH), the resources of the sidelink channel on which the at least one of the data or control information is transmitted and the resources of the channel configured to carry feedback on which the scheduling request is received comprising a same slot.

14. The method of claim 10, wherein the channel configured to carry feedback comprises a physical sidelink feedback channel (PSFCH), and the resources of the channel configured to carry feedback on which the scheduling request is received comprise two symbols of a slot in a time domain and a set of subchannels in a frequency domain.

15. The method of claim 10, wherein the at least one scheduling request comprises the at least one preamble with at least one valid cyclic shift.

16. The method of claim 15, further comprising:
transmitting configuration information associated with the supported set of preambles, the configuration information indicating at least one of the root Zadoff-Chu sequence or the at least one valid cyclic shift.

17. The method of claim 10, wherein the scheduling request is multiplexed with feedback on the resources of the channel configured to carry the feedback.

18. The method of claim 17, wherein on the resources of the channel configured to carry the feedback, the scheduling request comprises a first set of cyclic shifts and the feedback comprises a second set of cyclic shifts different from the first set of cyclic shifts.

19. An apparatus for wireless communication at a user equipment (UE), comprising:
a memory; and
at least one processor coupled to the memory and configured to:
generate a scheduling request to request to transmit at least one of data or control information on a sidelink channel, wherein the generating the scheduling request comprises determining a preamble based on a root Zadoff-Chu sequence, wherein the scheduling request comprises the preamble, and the preamble is transmitted on a second set of resources dedicated to feedback; and
transmit, to another UE, the scheduling request on resources of a channel configured to carry feedback responsive to transmissions on the sidelink channel, wherein the channel is configured with a first set of resources dedicated to scheduling requests and the second set of resources dedicated to feedback, and the first set of resources does not overlap with the second set of resources.

20. The apparatus of claim 19, wherein the at least one processor is further configured to:
receive, from the other UE based on the scheduling request, at least one grant indicating resources allocated on the sidelink channel; and
transmit, to the other UE based on the grant, at least one of data or control information on the resources allocated on the sidelink channel.

21. The apparatus of claim 19, wherein the at least one processor is further configured to:
receive, from the other UE, at least one of data or control information on resources of the sidelink channel; and
transmit, to the other UE on the channel configured to carry feedback, feedback responsive to the at least one of the data or control information transmitted on the resources of the sidelink channel, the feedback comprising either an acknowledgement (ACK) or a non-ACK (NACK) corresponding to the at least one of the data or control information.

22. The apparatus of claim 21, wherein the channel configured to carry feedback comprises a physical sidelink control channel (PSCCH), and the resources of the sidelink channel on which the at least one of the data or control information is transmitted and the resources of the channel configured to carry feedback on which the scheduling request is received comprising a same slot.

23. The apparatus of claim 19, wherein the channel configured to carry feedback comprises a physical sidelink feedback channel (PSFCH), and the resources of the channel configured to carry feedback on which the scheduling request is received comprise two symbols of a slot in a time domain and a set of subchannels in a frequency domain.

24. An apparatus for wireless communication at a user equipment (UE), comprising:
a memory; and
at least one processor coupled to the memory and configured to:
determine a supported set of preambles based on a root Zadoff-Chu sequence;
monitor resources on a channel for transmissions from other UE, the channel being configured to carry feedback from the other UE responsive to transmissions on a sidelink channel; and
receive at least one scheduling request from at least one of the other UE on the resources of the channel configured to carry the feedback based on monitoring the resources on the channel, wherein the channel is configured with a first set of resources dedicated to scheduling requests and a second set of resources dedicated to feedback, and the first set of resources does not overlap with the second set of resources, wherein the at least one scheduling request comprises at least one preamble included in the supported set of preambles, and the preamble is received on the first set of resources.

25. The apparatus of claim 24, wherein the at least one processor is further configured to:
transmit, to the at least one of the other UE based on the at least one scheduling request, at least one grant indicating resources allocated on the sidelink channel; and
receive, from the at least one of the other UE based on the grant, at least one of data or control information on the resources allocated on the sidelink channel.

26. The apparatus of claim 24, wherein the at least one processor is further configured to:
transmit, to the at least one of the other UE, at least one of data or control information on resources of the sidelink channel; and
receive, from the at least one of the other UE on the channel configured to carry feedback, feedback responsive to the at least one of the data or control information transmitted on the resources of the sidelink channel, the feedback comprising either an acknowledgement (ACK) or a non-ACK (NACK) corresponding to the at least one of the data or control information.

* * * * *